US010442081B2

(12) United States Patent
Kanazawa et al.

(10) Patent No.: US 10,442,081 B2
(45) Date of Patent: Oct. 15, 2019

(54) DEVICE AND METHOD FOR ESTIMATING POSSIBLE EXISTENCE REGION OF SPECIFIC STATE QUANTITY OF MOBILE ROBOT

(71) Applicants: HONDA MOTOR CO., LTD., Tokyo (JP); The University of Tokyo, Tokyo (JP)

(72) Inventors: Masao Kanazawa, Saitama (JP); Yoshiki Kanemoto, Saitama (JP); Shunichi Nozawa, Tokyo (JP); Yohei Kakiuchi, Tokyo (JP); Kei Okada, Tokyo (JP); Masayuki Inaba, Tokyo (JP)

(73) Assignees: HONDA MOTOR CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 165 days.

(21) Appl. No.: 15/632,729

(22) Filed: Jun. 26, 2017

(65) Prior Publication Data
US 2018/0001471 A1    Jan. 4, 2018

(30) Foreign Application Priority Data
Jun. 29, 2016    (JP) .................................. 2016-129399

(51) Int. Cl.
*B25J 9/16*    (2006.01)
*B62D 57/032*    (2006.01)
*B62D 57/02*    (2006.01)

(52) U.S. Cl.
CPC .......... *B25J 9/1664* (2013.01); *B62D 57/032* (2013.01); *B62D 57/02* (2013.01)

(58) Field of Classification Search
CPC ...... B25J 9/1664; B62D 57/02; B62D 57/032; G05D 2201/0217; Y10S 901/01
See application file for complete search history.

(56) References Cited

U.S. PATENT DOCUMENTS

| 2007/0156283 A1* | 7/2007 | Takenaka | ............... B25J 9/1664 700/245 |
| 2015/0051734 A1* | 2/2015 | Zheng | ................... B25J 9/1633 700/261 |

(Continued)

FOREIGN PATENT DOCUMENTS

JP    5221688    3/2013

OTHER PUBLICATIONS

Andrea Del Prete et al., "Fast Algorithms to Test Robust Static Equilibrium for Legged Robots", 2016 IEEE International Conference on Robotics and Automation (ICRA), Stockholm, Sweden, May 16-21, 2016, pp. 1601-1607, Discussed in specification, 7 pages.

*Primary Examiner* — Dale Moyer
(74) *Attorney, Agent, or Firm* — Rankin, Hill & Clark LLP

(57) ABSTRACT

An arithmetic processing unit 40 estimates a possible existence region of a specific state quantity by performing polyhedron projection processing for finding a projection region obtained by projecting a convex polyhedron to a subspace representing the specific state quantity, where the convex polyhedron is within a space configured with the contact reaction forces of a plurality of contacting portions (13, 23) of a mobile robot 1 and the specific state quantity as variable components and where the convex polyhedron is specified by a mechanical relation between the contact reaction forces and the specific state quantity and by a linear inequality representing a contact reaction force constraint condition.

2 Claims, 10 Drawing Sheets

(56) References Cited

U.S. PATENT DOCUMENTS

2016/0096267 A1\* 4/2016 Kaneko .................. B25J 9/1694
                                                    180/8.6
2016/0236349 A1\* 8/2016 Yamane ................. B25J 9/1664
2016/0236356 A1\* 8/2016 Waita ....................... B25J 17/00

\* cited by examiner

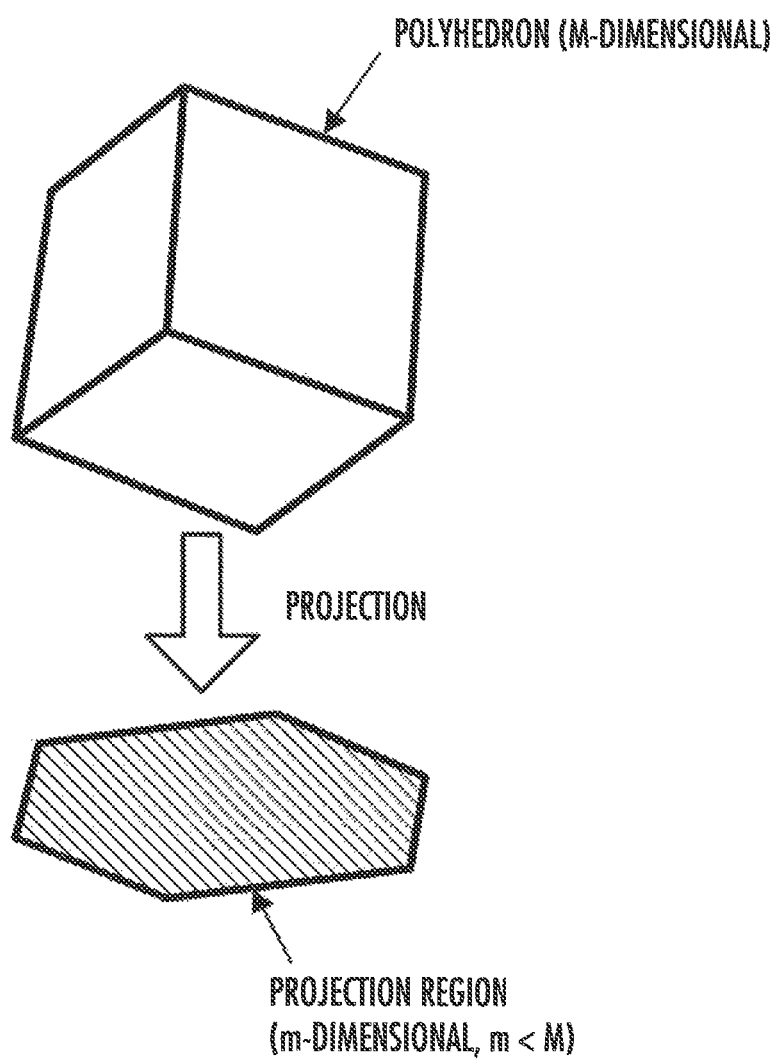

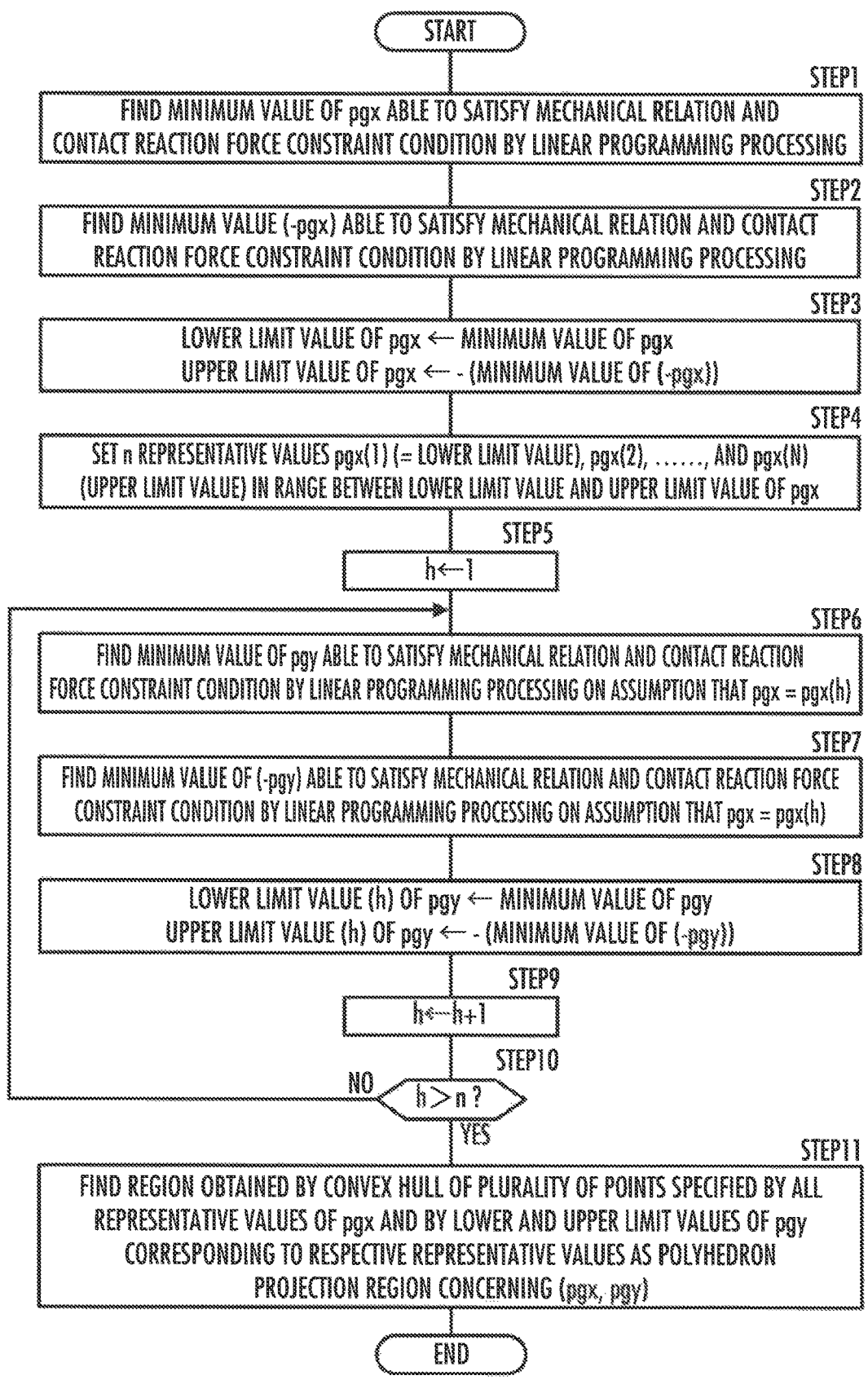

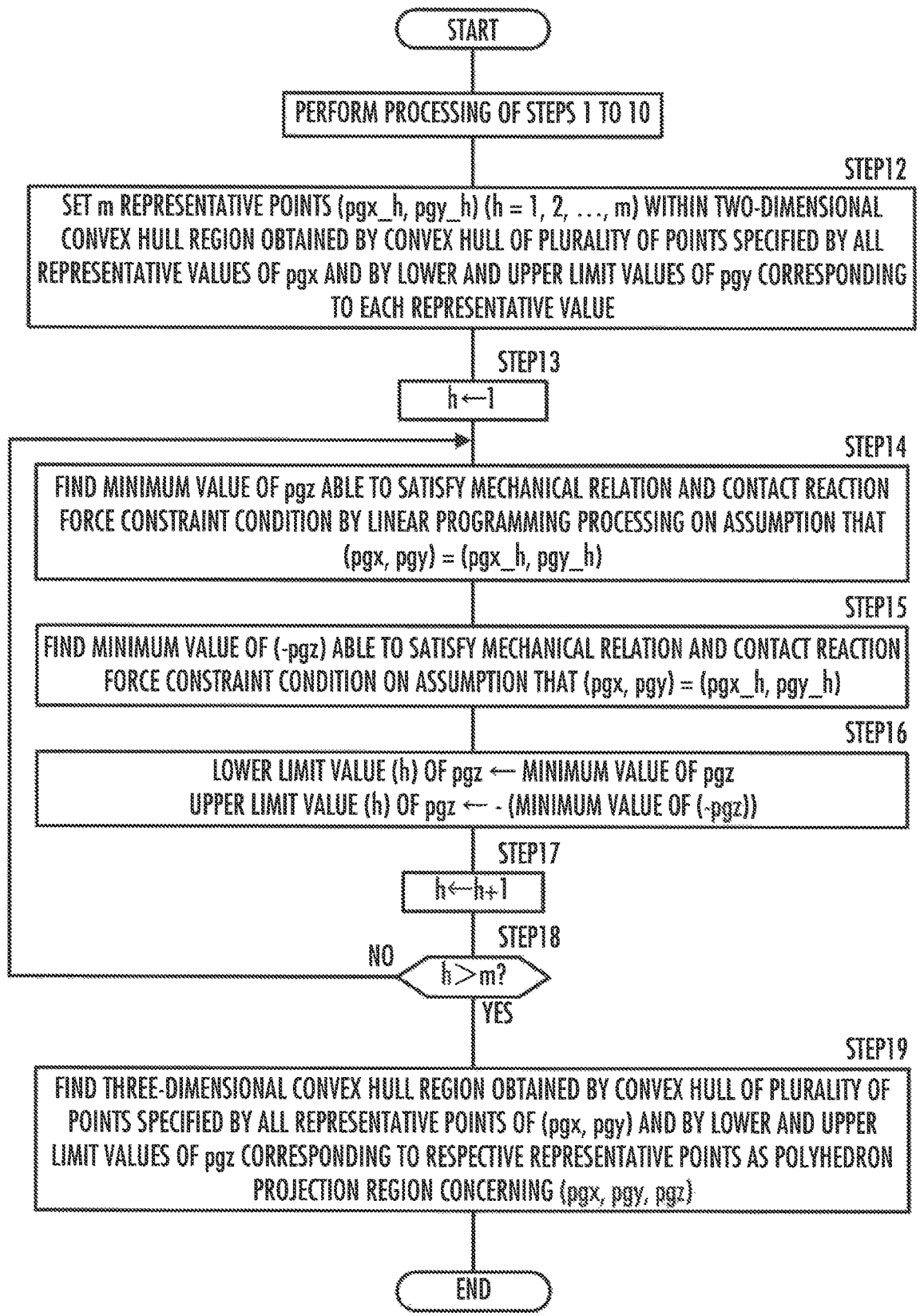

DEVICE AND METHOD FOR ESTIMATING POSSIBLE EXISTENCE REGION OF SPECIFIC STATE QUANTITY OF MOBILE ROBOT

BACKGROUND OF THE INVENTION

Field of the Invention

The present invention relates to a device and method for estimating a possible existence region of a specific state quantity, such as an overall center-of-gravity position, of a mobile robot.

Description of the Related Art

Conventionally, there has been generally known a legged mobile robot such as a humanoid robot as a mobile robot which moves by a motion of performing an air movement of each of a plurality of contacting portions and a contact with an external object following the air movement. In the present description, a term "contacting portion" of a mobile robot means a site which performs the air movement and the contact with an external object following the air movement while the mobile robot moves. For example, in the legged mobile robot, the distal end (foot portion) of each leg of the legged mobile robot corresponds to the "contacting portion."

In the technique of generating a desired motion of this type of mobile robot, conventionally the generation of a desired motion of the mobile robot is generally performed by setting a desired ZMP (a desired position of a zero moment point [ZMP]) within a supporting polygon, which is specified according to a desired contact position/posture (position and posture at the time of contact) of each contacting portion, and by using a dynamic model such as an inverted pendulum model so as to satisfy the desired ZMP (for example, refer to Japanese Patent No. 5221688).

Furthermore, a test technique related to static equilibrium robustness of a legged mobile robot is proposed in "Fast Algorithms to Test Robust Static Equilibrium for Legged Robots/Andrea Del Prete, Steve Tonneau and Nicolas Mansard/2016 IEEE International Conference on Robotics and Automation (ICRA)/Stockholm, Sweden, May 16-21, 2016." for example.

SUMMARY OF THE INVENTION

In recent years, demand is increasing on not only moving a mobile robot such as a humanoid robot on a generally flat floor, but also moving a mobile robot three-dimensionally in various action patterns under various environments. For example, demand is increasing on making a mobile robot to step up and down a ladder, to move on an irregular ground with markedly uneven or bumpy surface, to move holding on to an arm rail on a slope or uneven ground, or the like.

In the case of three-dimensionally moving the mobile robot in various action patterns in this manner, the mobile robot receives a contact reaction force from an external object through each contacting portion in a form different from that of the case where the mobile robot moves on a flat floor.

For example, when the legged mobile robot moves (walks) on a flat floor, the mobile robot receives a contact reaction force (a reaction force from the floor) in a state where its overall center of gravity is generally located around just above the supporting polygon. On the other hand, when the mobile robot steps up and down a ladder, the mobile robot receives a contact reaction force (a reaction force from the ladder) in a state where its overall center of gravity is horizontally away from each contacting portion in contact with the ladder.

Therefore, in the case of three-dimensionally moving the mobile robot in various action patterns and in order to generate a desired motion enabling the mobile robot to move stably, it is necessary to generate a desired motion of the mobile robot so as to satisfy constraint conditions which will be not or less needed in the case of moving the mobile robot on a flat floor regarding the contact reaction force received by each contacting portion (for example, constraint conditions for preventing a spin of the mobile robot, and the like).

Therefore, it has been difficult to appropriately generate a desired motion for three-dimensionally moving the mobile robot in various action patterns in the same method as in the case of moving the mobile robot on a flat floor.

On the other hand, when focusing on the overall center-of-gravity position, the translational motion state quantity of the overall center of gravity, or the rotational motion state quantity about the overall center of gravity of the mobile robot, these three types of state quantity (hereinafter, sometimes generically referred to as "overall motion state quantity") has a certain mechanical relation with a resultant force of the contact reaction forces received by all contacting portions brought into contact with external objects, independently of the action patterns of the mobile robot.

In the present description, the term "translational motion state quantity of the overall center of gravity" of the mobile robot means a state quantity specifying a translational inertial force generated by a translational motion of the overall center of gravity of the mobile robot (specifically, the state quantity is a translational acceleration of the overall center of gravity or a temporal change rate of a translational momentum of the overall center of gravity). Moreover, the term "rotational motion state quantity about the overall center of gravity" of the mobile robot means a state quantity specifying a rotational inertial force generated by a rotational motion about the overall center of gravity of the mobile robot (specifically, the state quantity is a rotation angular acceleration about the overall center of gravity or a temporal change rate of an angular momentum about the overall center of gravity).

In this case, the above "mechanical relation" is expressed by an equation which represents a balance between a resultant force of the contact reaction forces acting on the mobile robot through respective contacting portions, a gravitational force acting on the mobile robot, and the overall inertial force generated on the mobile robot.

Therefore, a possible existence region of a value of the aforementioned overall motion state quantity necessary to satisfy the constraint condition of the contact reaction force received by each contacting portion of the mobile robot (hereinafter, sometimes simply referred to as "contact reaction force constraint condition") is specified according to the contact reaction force constraint condition and to the aforementioned mechanical relation in response to an action pattern of the mobile robot in the desired motion.

Thus, each of the above overall motion state quantities is made appropriate to the overall motion state of the mobile robot.

Therefore, in the case of generating a desired motion for three-dimensionally moving the mobile robot in various action patterns, the possible existence region of the value of each overall motion state quantity is able to be used as a kinematic basic guideline (a condition to be satisfied kinematically) for generating the desired motion so as to satisfy the contact reaction force constraint condition corresponding to the action pattern of the mobile robot in the desired motion (eventually, generating the desired motion so that the mobile robot stably moves).

Accordingly, in the case of generating the desired motion for three-dimensionally moving the mobile robot in various action patterns, it is required to provide a technique of enabling an estimation (identification) of a possible existence region of one or more overall motion state quantities as a guideline for generating a desired motion so as to satisfy the contact reaction force constraint condition.

Furthermore, in this case, it is required to enable the above possible existence region to be estimated at relatively high speed in order to enable the desired motion to be generated while moving the mobile robot.

The present invention has been made in view of the above background. It is therefore an object of the present invention to provide a device and a method capable of appropriately estimating a possible existence region of a specific state quantity (one or more state quantities among the overall center-of-gravity position, the translational motion state quantity of the overall center of gravity, and the rotational motion state quantity about the overall center of gravity of the mobile robot) for satisfying a contact reaction force constraint condition.

According to an aspect of the present invention, there is provided a device for estimating a possible existence region of a specific state quantity of a mobile robot, in which the possible existence region is intended for a value of a specific state quantity composed of one or more state quantities among an overall center-of-gravity position of the mobile robot which moves by a motion of repeating an air movement and a contact with an external object following the air movement of each of a plurality of contacting portions, a translational motion state quantity of the overall center of gravity and a rotational motion state quantity about the overall center of gravity and in which the possible existence region is able to satisfy a contact reaction force constraint condition which is a constraint condition related to contact reaction forces acting on the respective contacting portions, wherein the device includes a polyhedron projection processing section which performs one of multi parametric linear programming processing and processing of repeating linear programming processing more than once, as polyhedron projection processing for finding a projection region obtained by projecting a convex polyhedron to a subspace representing the specific state quantity among variable components, where the convex polyhedron is within a space configured with the contact reaction forces of the plurality of contacting portions and the specific state quantity as the variable components and where the convex polyhedron is specified by a mechanical relation between the contact reaction forces and the specific state quantity and by a linear inequality representing a contact reaction force constraint condition, and the device is configured to output the projection region found by the polyhedron projection processing as an estimated region of the possible existence region (first invention).

The above "contact reaction force" means a contacting force represented by a translational force or by a pair of a translational force and a moment.

In the case of moving the mobile robot in various action patterns, the constraint condition concerning a contact reaction force (the contact reaction force constraint condition) acting on each contacting portion of the mobile robot is generally able to be expressed by a linear inequality. In this case, assuming a space including the contact reaction force of each of the plurality of contacting portions and the specific state quantity as variable components (hereinafter, the space is referred to as "multivariate space" in some cases), a set of points satisfying the mechanical relation and the contact reaction force constraint condition (a pair of the contact reaction force and the specific state quantity) in the multivariate space is expressed as a region enclosed by a convex polyhedron in the multivariate space.

In the first invention, the convex polyhedron may be either of a convex polyhedron which forms a bounded region (a closed region) and a convex polyhedron which forms an unbounded region (an open region).

Furthermore, the above convex polyhedron is able to be projected to a subspace (a lower-dimensional space than the above multivariate space) representing some variable components of the multivariate space by polyhedron projection processing. In addition, the polyhedron projection processing is able to be accomplished relatively in a short time by one of the multi parametric linear programming processing and processing of repeating the linear programming processing more than once.

Therefore, the possible existence region estimation device according to the present invention performs one of the multi parametric linear programming processing and the processing of repeating the linear programming processing more than once, as polyhedron projection processing for finding a projection region obtained by projecting the above convex polyhedron to a subspace representing the specific state quantity of the variable components of the multivariate space. The projection region found by the polyhedron projection processing is acquired as a possible existence region of the specific state quantity able to satisfy the contact reaction force constraint condition.

In this case, the contact reaction force constraint condition specifying the convex polyhedron is expressed by a linear inequality. Moreover, the mechanical relation is expressed by a relatively-simple relational expression as expressed by an expression (8) described later. Therefore, the projection region, as an estimated region of the possible existence region, is able to be found at relatively high speed by one of the multi parametric linear programming processing and the processing of repeating the linear programming processing more than once.

Therefore, according to the present invention, it is possible to appropriately estimate the possible existence region of the specific state quantity for satisfying the contact reaction force constraint condition (one or more state quantities among the overall center-of-gravity position, the translational motion state quantity of the overall center of gravity, and the rotational motion state quantity about the overall center of gravity of the mobile robot).

In this invention, the contact reaction force constraint condition preferably includes one or more conditions among a condition representing a permissible range of a friction force among the contact reaction forces of the plurality of contacting portions, a condition representing the direction of a normal force of the contact reaction forces, a condition representing an existence permissible region of a center of pressure of the contact reaction forces, and a condition representing a permissible range of the contact reaction forces specified according to a range of a driving force which can be generated at each joint of the mobile robot (second invention).

According thereto, it is possible to set an appropriate contact reaction force constraint condition for enabling the mobile robot to move stably for various action patterns to be implemented by a desired motion of the mobile robot.

Consequently, this enables an estimation of a preferable possible existence region of the specific state quantity for various action patterns.

In the first or second invention, the processing of repeating the linear programming processing more than once out of the polyhedron projection processing may be configured as described below in particular.

More specifically, in the case where the specific state quantity includes two state quantities $s(1)$ and $s(2)$, the polyhedron projection processing section may be configured to perform the following processes 1 to 4 as the polyhedron projection processing (third invention).

Process 1: Find the upper limit value and the lower limit value of the state quantity $s(1)$ able to satisfy the mechanical relation and the contact reaction force constraint condition by the linear programming processing.

Process 2: Set a plurality of representative values with the upper limit value and the lower limit value of the state quantity $s(1)$ included in a range between the upper limit value and the lower limit value.

Process 3: Find the upper limit value and the lower limit value of the state quantity $s(2)$ able to satisfy the mechanical relation and the contact reaction force constraint condition by the linear programming processing for all representative values of the state quantity $s(1)$ on the assumption that the value of the state quantity $s(1)$ coincides with one of the plurality of representative values set in the process 2.

Process 4: Find a region obtained by convex hull of a plurality of points specified by all respective representative values of the state quantity $s(1)$ and by the upper limit value and the lower limit value of the state quantity $s(2)$ for each representative value of the state quantity $s(1)$ as the projection region.

Furthermore, in the case where the specific state quantity includes three or more state quantities $s(i)$ ($i=1, 2, \ldots$, and N), the polyhedron projection processing section may be configured to perform the following processes 11 to 18 as the polyhedron projection processing (fourth invention).

Process 11: Find the upper limit value and the lower limit value of the state quantity $s(1)$ able to satisfy the mechanical relation and the contact reaction force constraint condition by the linear programming processing.

Process 12: Set a plurality of representative values with the upper limit value and the lower limit value of the state quantity $s(1)$ included in a range between the upper limit value and the lower limit value.

Process 13: Find the upper limit value and the lower limit value of the state quantity $s(2)$ able to satisfy the mechanical relation and the contact reaction force constraint condition by the linear programming processing for all representative values of the state quantity $s(1)$ on the assumption that the value of the state quantity $s(1)$ coincides with one of the plurality of representative values set in the process 12.

Process 14: Set a plurality of representative points, including respective apexes of a two-dimensional convex hull region, within the two-dimensional convex hull region which is obtained by convex hull of a plurality of points specified by all respective representative values of the state quantity $s(1)$ and by the upper limit value and the lower limit value of the state quantity $(2)$ for each representative value of the state quantity $s(1)$ in a two-dimensional space with the state quantities $s(1)$ and $s(2)$ as variable components.

Process 15: Find the upper limit value and the lower limit value of the state quantity $s(k)$ able to satisfy the mechanical relation and the contact reaction force constraint condition by the linear programming processing for all representative points set within a $(k-1)$-dimensional convex hull region, on the assumption that each of the values of $(k-1)$ ($k$: 3 or greater integer) state quantities $s(1), \ldots$, and $s(k-1)$, among N state quantities $s(i)$ ($i=1, 2, \ldots$, and N), coincides with the value at one set representative point within the $(k-1)$-dimensional convex hull region.

Process 16: If $k<N$, set a plurality of representative points, including respective apexes of a k-dimensional convex hull region, within the k-dimensional convex hull region which is obtained by convex hull of a plurality of points specified by a group of values of $s(1), \ldots$, and $s(k-1)$ corresponding to all respective representative points set within the $(k-1)$-dimensional convex hull region and by the upper limit value and the lower limit value of a state quantity $s(k)$ for each of the representative points in a k-dimensional space with k state quantities $s(1), \ldots$, and $s(k)$ as variable components.

Process 17: Repeat the processes 15 and 16 until the process 15 when $k=N$ is completed and, upon the completion of the process 15 when $k=N$, proceed to process 18.

Process 18: Find, as the projection region, an N-dimensional convex hull region obtained by convex hull of a plurality of points specified by a group of values of $s(1), \ldots$, and $s(N-1)$ corresponding to all respective representative points set within an $(N-1)$-dimensional convex hull region and by the upper limit value and the lower limit value of a state quantity $s(N)$ for each of the representative points in an N-dimensional space with N state quantities $s(i)$ ($i=1, 2, \ldots$, and N) as variable components.

In addition, the repetition of the processes 15 and 16 in the fourth invention is performed so that the value of k is incremented by one for each repetition. The representative points "set within a $(k-1)$-dimensional convex hull region" in the process 15 are representative points set in the process 14 or the representative points set in the process 16 performed immediately before the process 15. Furthermore, if $N=3$, $k=N$ is satisfied in the process 15 following the process 14 and therefore the processes 16 and 17 are substantially omitted.

According to the third invention, a plurality of points on a boundary plane of the projection region are found by the processes 1 to 3 in the case where the specific state quantity includes two state quantities $s(1)$ and $s(2)$. Therefore, the projection region is able to be found approximately by finding a region obtained by the convex hull of the plurality of points in the process 4.

Furthermore, according to the fourth invention, the plurality of points on the boundary plane of the projection region are found by the processes 11 to 17 in the case where the specific state quantity includes three or more state quantities $s(i)$ ($i=1, 2, \ldots$, and N). Therefore, the projection region is able to be found approximately by finding a region obtained by the convex hull of the plurality of points in the process 18.

In this case, in the processes 1 and 3 in the third invention or the processes 11, 13, and 15 in the fourth invention, the upper and lower limit values of each state quantity are able to be found at relatively high speed by the known linear programming processing.

Furthermore, according to another aspect of the present invention, in order to achieve the above object, there is provided a method of estimating a possible existence region of a specific state quantity of a mobile robot, in which the possible existence region is intended for a value of a specific state quantity composed of one or more state quantities among an overall center-of-gravity position of the mobile robot which moves by a motion of repeating an air movement and a contact with an external object following the air movement of each of a plurality of contacting portions, a translational motion state quantity of the overall center of gravity, and a rotational motion state quantity about the overall center of gravity and in which the possible existence region is able to satisfy a contact reaction force constraint condition which is a constraint condition related to contact reaction forces acting on the respective contacting portions, the method including the step of performing one of multi parametric linear programming processing and processing of repeating linear programming processing more than once, as polyhedron projection processing for finding a projection region obtained by projecting a convex polyhedron to a subspace representing the specific state quantity among variable components, where the convex polyhedron is within a space configured with the contact reaction forces of the plurality of contacting portions and the specific state quantity as the variable components and where the convex polyhedron is specified by a mechanical relation between the contact reaction forces and the specific state quantity and by a linear inequality representing a contact reaction force constraint condition, wherein the projection region found by the polyhedron projection processing is output as an estimated region of the possible existence region (fifth invention).

According to the fifth invention, the same advantageous effects as those in the first invention are achieved. For the fifth invention, the same modes as those of the second to fourth inventions may be used.

BRIEF DESCRIPTION OF THE DRAWINGS

FIG. 4 is a diagram conceptually illustrating polyhedron projection processing;

FIG. 5 is a flowchart illustrating processing of a first example of the polyhedron projection processing;

FIG. 7 is a flowchart illustrating processing of a second example of the polyhedron projection processing

DESCRIPTION OF THE PREFERRED EMBODIMENTS

Figure 1:
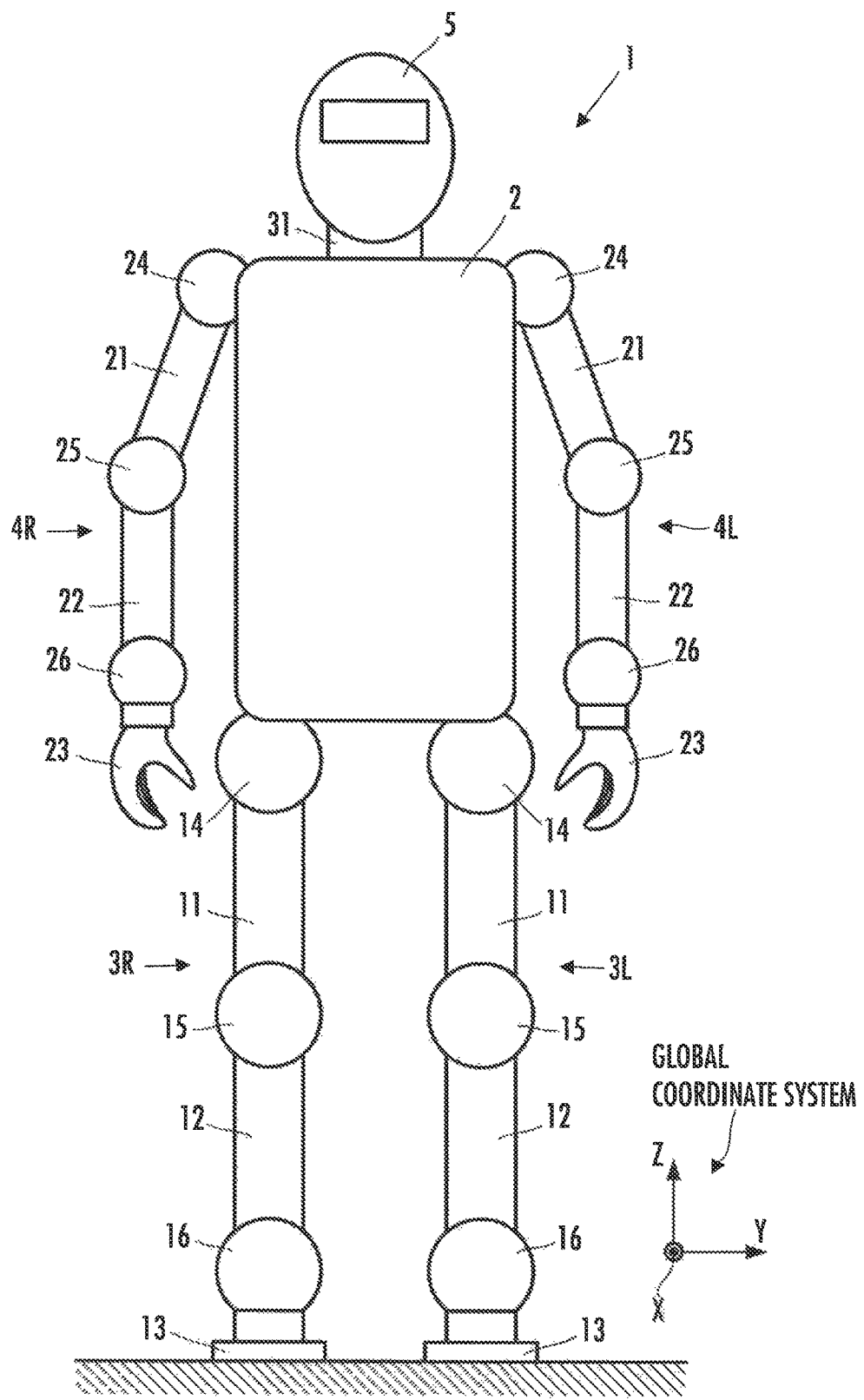
FIG. 1 is a diagram illustrating a schematic configuration of a mobile robot according to one embodiment of the present invention.

One embodiment of the present invention will be described with reference to FIGS. 1 to 12B. Referring to FIG. 1, a mobile robot 1 in this embodiment is a humanoid robot as an example. This mobile robot 1 (hereinafter, sometimes simply referred to as "robot 1") includes a base body 2 corresponding to a body, a pair of (two) right and left leg links 3R and 3L and a pair of (two) right and left arm links 4R and 4L, as a plurality of movable links extended from the base body 2, and a head 5.

In the description of this embodiment, the characters "R" and "L" appended to the reference numerals mean an element on the right side and an element on the left side when facing the front with respect to the base body 2 of the robot 1, respectively. The characters "R" and "L," however, may be omitted unless it is particularly necessary to distinguish between the right side and the left side.

Moreover, in the following description, each of the leg links 3L and 3R and the arm links 4L and 4R is sometimes simply referred to as a movable link.

Each leg link 3 is extended from the bottom of the base body 2. Each leg link 3 is composed of elemental links, which correspond to a thigh portion 11, a crus portion 12, and a foot portion 13, connected to each other through a hip joint 14, a knee joint 15, and an ankle joint 16 starting from the base body 2 side. The foot portion 13, which is a distal end of each leg link 3, is a contacting portion appropriately brought into contact with an external object (ground, floor, wall, or the like) when the robot 1 moves or the like.

The joints 14, 15, and 16 between the foot portion 13 of each leg link 3 and the base body 2 are configured so that the boot portion 13 of the leg link 3 has six degrees of freedom of motion, for example, with respect to the base body 2 in this embodiment.

For example, the hip joint 14 is composed of three elemental joints (not illustrated) so as to have a freedom degree of rotation about three axes in total. The knee joint 15 is composed of one elemental joint (not illustrated) so as to have a freedom degree of rotation about one axis. The ankle joint 16 is composed of two elemental joints (not illustrated) so as to have a freedom degree of rotation about two axes in total. Note that the elemental joint is a joint having a freedom degree of rotation about one axis. The elemental joint is composed of two members engaged with each other so as to be free to relatively rotate about one axis.

Each arm link 4 is extended from the upper part of the base body 2. Each arm link 4 is composed of elemental links, which correspond to an upper arm portion 21, a forearm portion 22, and a hand portion 23, connected to each other through a shoulder joint 24, an elbow joint 25, and a wrist joint 26 starting from the base body 2 side.

In this embodiment, each arm link 4 is a movable link capable of functioning as a leg link which is brought into contact with an external object, as needed, besides the leg links 3 and 3. In this case, the hand portion 23, which is a distal end of each arm link 4, is a contacting portion which is appropriately brought into contact with an external object (ground, floor, wall, or the like) according to the action mode or the like when the robot 1 moves.

The joints 24, 25, and 26 between the hand portion 23 of each arm link 4 and the base body 2 are configured so that the hand portion 23 of each arm link 4 has six degrees of freedom, for example, with respect to the base body 2.

For example, the shoulder joint 24 is composed of three elemental joints (not illustrated) so as to have a freedom degree of rotation about three axes in total. The elbow joint 25 is composed of one elemental joint (not illustrated) so as to have a freedom degree of rotation about one axis. The wrist joint 26 is composed of two elemental joints (not illustrated) so as to have a freedom degree of rotation about two axes in total.

Furthermore, the hand portion 23 of each arm link 4 is configured so as to be able to grip an object in this embodiment. For example, each hand portion 23 is composed of an appropriate clamping mechanism, a plurality of finger mechanisms capable of acting in the same manner as human fingers, and the like.

The head 5 is attached to the top end of the base body 2 through a neck joint 31. The neck joint 31 is configured so as to have a freedom degree of rotation about one, two, or three axes.

The above is the outline of the mechanistic configuration of the robot 1.

The robot 1 configured as described above is able to move by a motion of repeating an action of moving one or more movable links 3 or 4 among four movable links 3, 3, 4, and 4 in the air without bringing the movable links into contact with an external object (air movement action) and an action of bringing the movable links 3 or 4 into contact with an external object following the air movement action.

For example, the robot 1 is able to perform a walking action by moving two leg links 3 and 3 in the same motion pattern as a leg motion in a human walking action (a motion pattern of a bipedal gait).

In this case, it is also possible to move the robot 1 by moving leg links 3 and 3 while appropriately bringing the arm link 4 into contact with a wall, an arm rail, or the like.

Moreover, for example, it is also possible to move the robot 1 by using the four movable links 3, 3, 4, and 4 as legs and by moving the four movable links 3, 3, 4, and 4 in a trot, crawl, pace, or any other motion pattern (a motion pattern of a quadrupedal gait).

Furthermore, the robot 1 is also able to step up and down the ladder or the like by using four movable links 3, 3, 4, and 4, for example.

In addition, each leg link 3 or each arm link 4 of the robot 1 may be configured to have seven or more degrees of freedom of motion. Moreover, each of the leg links 3 and the arm links 4 may include not only a rotary joint, but also a direct-acting joint.

Furthermore, in the case where the robot 1 does not require a gripping action with the hand portion 23, the distal end (contacting portion) of each arm link 4 may have a structure not including a mechanism for a gripping action. In addition, the robot 1 may be a robot not having the head 5.

Moreover, the base body 2 may include a joint. For example, the base body 2 may be composed of a lower base body to which the leg links 3 and 3 are connected, an upper base body to which the arm link 4 and 4 are connected, and a joint which connects the upper base body and the lower base body to each other so as to be relatively displaced.

In the following description, the foot portion 13 of each leg link 3 and the hand portion 23 of each arm link 4 will be sometimes generically referred to as "contacting portion (13 or 23)."

Figure 2:
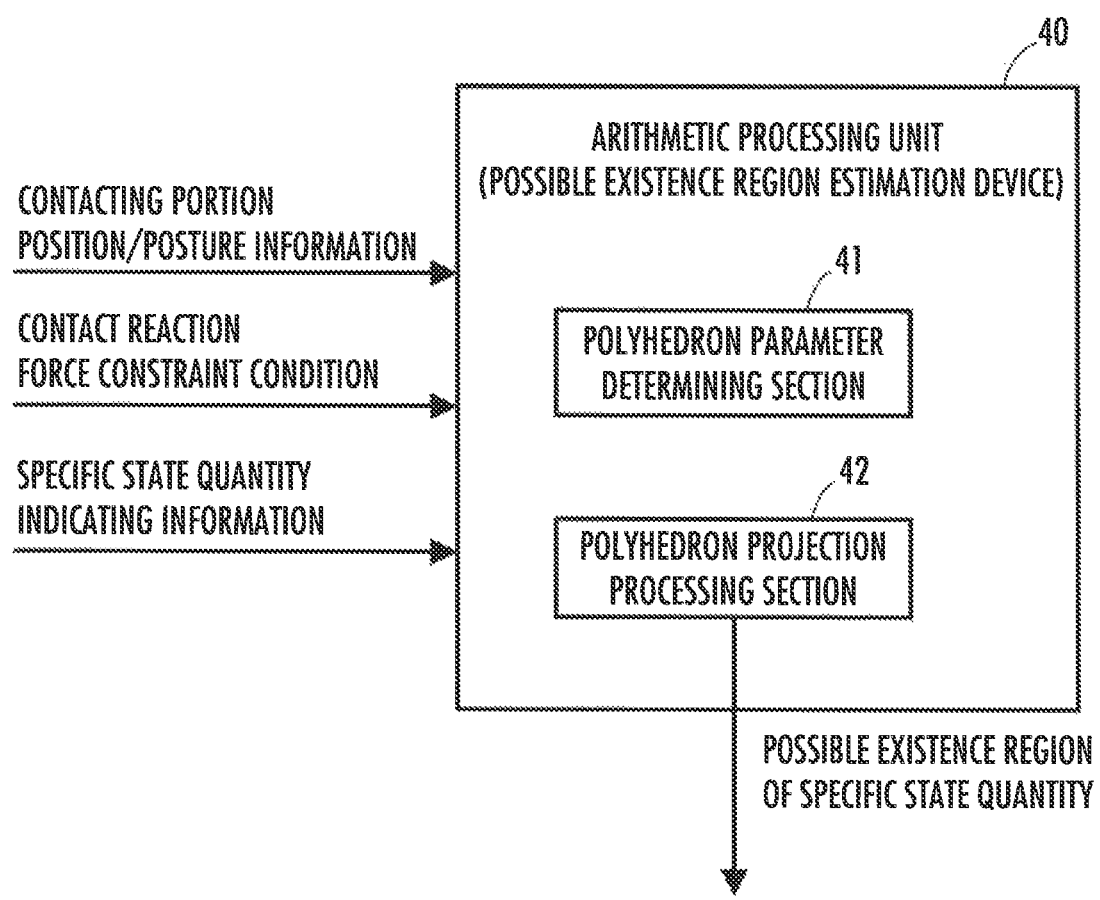
FIG. 2 is a block diagram illustrating an arithmetic processing unit as a possible existence region estimation device in the embodiment.

FIG. 2 illustrates an arithmetic processing unit 40 having a function of a possible existence region estimation device of a specific state quantity of the robot 1. This arithmetic processing unit 40 is composed of one or more electronic circuit units including a CPU, a RAM, a ROM, an interface circuit, and the like or is composed of one or more computers. Alternatively, the arithmetic processing unit 40 is composed of a combination of an electronic circuit unit and a computer. The arithmetic processing unit 40 is mounted in the robot 1 or arranged in the outside. Note that the arithmetic processing unit 40 may include a function of performing an action control of the robot 1. Furthermore, the arithmetic processing unit 40 may include both of an element mounted in the robot 1 and an element arranged in the outside.

In this embodiment, the arithmetic processing unit 40 is provided with contacting portion position/posture information which indicates a desired position/posture of each contacting portion (13 or 23) brought into contact with an external object, information which indicates a contact reaction force constraint condition, which is a constraint condition of the contact reaction force received from an external object by each contacting portion (13 or 23) which is brought into contact with the external object at each sampling time point, and specific state quantity indicating information which indicates the type of specific state quantity whose possible existence region is to be estimated by the arithmetic processing unit 40 regarding a desired motion of the robot 1, at each of a plurality of sampling time points (for example, a time point for each predetermined time interval) in a moving action (desired motion) of the robot 1 in a desired action pattern. The above contacting portion position/posture information also includes information indicating which site (one of the foot portions 13R and 13L and the hand portions 23R and 23L) of the robot 1 corresponds to each contacting portion (13 or 23) to be brought into contact with the external object at each sampling time point.

Note here that the specific state quantity indicated by the above specific state quantity indicating information is a state quantity related to an entire motion of the robot 1. More specifically, the specific state quantity means one or more state quantities among the overall center-of-gravity position of the robot 1, the translational motion state quantity of the overall center of gravity of the robot 1 (a translational acceleration of the overall center of gravity or a temporal change rate of a translational momentum of the overall center of gravity), and a rotational motion state quantity about the overall center of gravity of the robot 1 (a rotation angular acceleration of the entire robot 1 about the overall center of gravity or a temporal change rate of an angular momentum of the entire robot 1 about the overall center of gravity).

For example, it is possible to use, as a specific state quantity, one or more components of a three-dimensional vector representing a spatial position of the overall center of gravity of the robot 1, one or more components of a three-dimensional vector representing a spatial translational momentum or a translational acceleration of the overall center of gravity of the robot 1, one or more components of a three-dimensional vector representing a temporal change rate of a spatial angular momentum or a rotation angular acceleration about the overall center of gravity of the robot 1, or a combination of these components.

Furthermore, the desired position/posture of each contacting portion (13 or 23) indicated by the above contacting portion position/posture information means a pair of desired values of the position and posture of each contacting portion (13 or 23).

In the description of this embodiment, the "position" of each contacting portion (13 or 23) means a spatial position of a representative point of the contacting portion (13 or 23), and the "posture" of each contacting portion (13 or 23) means a spatial direction of the contacting portion (13 or 23).

In addition, the desired position/posture of each contacting portion (13 or 23) is a pair of position and posture viewed in the global coordinate system (an XYZ coordinate system illustrated in FIG. 1, for example) arbitrarily set by way of design for the mobile environment of the robot 1.

Moreover, regarding the above contact reaction force constraint condition, the contact reaction force received from an external object by each contacting portion (13 or 23) means a so-called contact wrench. This contact reaction force (contact wrench) is a pair (a six-component vector) of a translational force (a three-dimensional vector) and a moment (a three-dimensional vector).

Furthermore, in this embodiment, the above contact reaction force constraint condition includes a condition representing a permissible range of a friction force of a contact reaction force received from an external object by each contacting portion (13 or 23) (hereinafter, referred to as "friction force constraint condition"), a condition representing an existence permissible region of the center of pressure (so-called COP) of the contact reaction force received by each contacting portion (13 or 23) (hereinafter, referred to as "COP constraint condition"), and a condition limiting the direction of a drag of the contact reaction force (hereinafter, referred to as "drag constraint condition").

These contact reaction force constraint conditions are conditions set (defined) as described below.

Note here that a character "i" (i=1, 2, ..., and NL. NL: the total number of contacting portions (13 or 23)) is used as a character indicating an identification number for distinguishing the respective contacting portions (13 or 23). In addition, the contacting portion (13 or 23) having the identification number i is referred to as "i-th contacting portion" in some cases.

Figure 3:
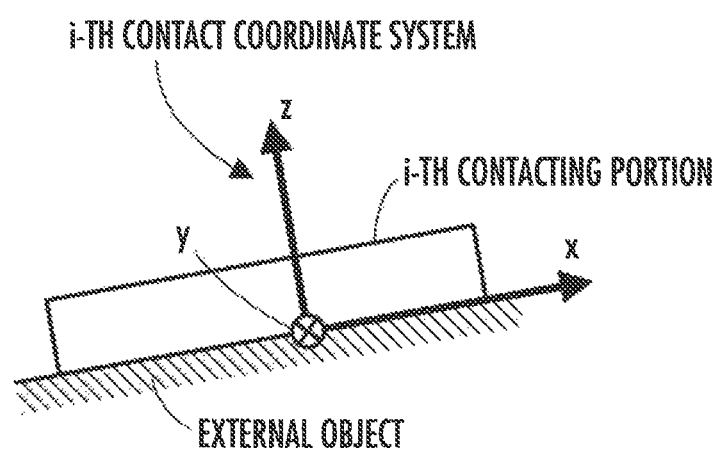
FIG. 3 is a diagram illustrating a coordinate system (an i-th contact coordinate system) set for each contacting portion.

Moreover, as a coordinate system representing a contact reaction force related to the contact reaction force constraint condition concerning the i-th contacting portion, an xyz coordinate system set as illustrated in FIG. 3, for example, is used for convenience. The xyz coordinate system is specifically a local coordinate system (hereinafter, referred to as the i-th contact coordinate system) with an axis in a direction perpendicular to a contact surface between the i-th contacting portion and an external object defined as the z axis and with two axes perpendicular to each other on a plane including the contact surface defined as the x axis and the y axis. The origin of this i-th contact coordinate system is a point on a plane including the contact surface between the i-th contacting portion and the external object.

Furthermore, an x-axis direction component, a y-axis direction component, and a z-axis direction component of a translational force of a contact reaction force, which the i-th contacting portion receives from an external object with which the i-th contacting portion comes in contact, are denoted by fx(i), fy(i), and fz(i), respectively, and a component in the direction about the x axis, a component in the direction about the y axis, and a component in the direction about the z axis of a moment of the contact reaction force are denoted by nx(i), ny(i), and nz(i), respectively.

Furthermore, a vector composed of six components, fx(i), fy(i), fz(i), nx(i), ny(i), and nz(i) (a column vector), in other words, a contact reaction force, which is received by the i-th contacting portion and represented as a vector viewed in the i-th contact coordinate system, will be denoted by ↑w(i) (≡[fx(i), fy(i), fz(i), nx(i), ny(i), nz(i)]$^T$). In the present description, a variable with "↑" prepended means a vector having a plurality of components (column vector) and a superscript "T" means a vector or a matrix transpose.

Moreover, in the present description, a symbol "·" is used as an arithmetic symbol representing a multiplication or an inner product and a symbol "x" is used as an arithmetic symbol representing an outer product (vector product).

On the premise of the above, the contact reaction force constraint condition will be described below. More specifically, the aforementioned friction force constraint condition is composed of a translational friction force constraint condition, which represents a permissible range of a translational friction force of a contact reaction force received from an external object by each contacting portion (13 or 23), and a rotational friction force constraint condition, which represents a permissible range of a rotational friction force (a friction force moment) of the contact reaction force.

The translational friction force constraint condition is, in other words, a constraint condition for preventing an occurrence of a translational slippage between each contacting portion (13 or 23) and an external object. This translational friction force constraint condition is expressed by the following expressions (1a) and (1b), for example.

$$\mu t(i) \cdot fz(i) \geq fx(i) \geq -\mu t(i) \cdot fz(i) \tag{1a}$$

$$\mu t(i) \cdot fz(i) \geq fy(i) \geq -\rho t(i) \cdot fz(i) \tag{1b}$$

where μt(i) is a friction coefficient (a setting value) concerning a translational friction force of the contact reaction force ↑w(i) received from an external object by the i-th contacting portion. In addition, fx(i) and fy(i) correspond to an x-axis direction component and a y-axis direction component of the translational friction force, and fz(i) corresponds to a normal force of the contact reaction force.

In addition, the condition for preventing an occurrence of the translational slippage between the i-th contacting portion and an external object is expressed in principle by an inequality "√(fx(i)$^2$+fy(i)$^2$)≤μt(i)·fz(i) (an inequality representing that the translational friction force, as a two-dimensional vector, falls within a permissible region, which is referred to as so-called "friction circle").

This inequality, however, is a nonlinear inequality and therefore the translational friction force constraint condition is approximately expressed by the above inequalities (1a) and (1b) in this embodiment. In this case, the value of the friction coefficient μt(i) in the inequalities (1a) and (1b) is set to a value rather smaller than the estimated value of an actual friction coefficient between the i-th contacting portion and the external object so that a quadrangular region as a permissible region of the translational friction force (vector) specified by the inequalities (1a) and (1b) does not depart from the above friction circle.

The permissible region of the translational friction force specified by the inequalities (1a) and (1b) is specifically a quadrangular region enclosed by two straight lines parallel to the x axis of the i-th contact coordinate system and two straight lines parallel to the y axis thereof. Note that, however, the boundary line of the permissible region of the translational friction force specified by the translational friction force constraint condition may be oblique to the x or y axis. Moreover, the permissible region may be a polygonal region other than the quadrangular region. In this case, the translational friction force constraint condition can be expressed by a plurality of inequalities in the form of "a·fx(i)+b·fy(i)≥c·fz(i)" (characters a, b, and c are constant values), for example.

The rotational friction force constraint condition is, in other words, a constraint condition for preventing an occurrence of a rotational slippage (spin) between each contacting portion (13 or 23) and an external object. This rotational friction force constraint condition is expressed by the following expression (2), for example.

$$\mu r(i) \cdot fz(i) \geq nz(i) \geq -\mu r(i) \cdot fz(i) \quad (2)$$

where μr(i) is a friction coefficient (setting value) concerning a friction force moment (a rotational friction force) in a direction about an axis perpendicular to the contact surface of the contact reaction force ↑w(i) received from the external object by the i-th contacting portion. Furthermore, nz(i) corresponds to the friction force moment.

In addition, it is preferable to previously set the respective setting values of the above friction coefficients μt(i) and μr(i) in the translational friction force constraint condition and the rotational friction force constraint condition to values rather smaller than the estimated value of the actual friction coefficient in generating a desired motion of the robot 1 so as to prevent an occurrence of a slippage (a translational slippage and a rotational slippage) between the i-th contacting portion and the external object when possible.

The COP constraint condition is for use in causing the COP of the contact reaction force received from the external object by each contacting portion (13 or 23) to fall within the contact surface between the contacting portion (13 or 23) and the external object. This COP constraint condition is expressed by the following expressions (3a) and (3b).

$$Lxp(i) \geq -ny(i)/fz(i) \geq Lxm(i) \quad (3a)$$

$$Lyp(i) \geq nx(i)/fz(i) \geq Lym(i) \quad (3b)$$

where −ny(i)/fz(i) in the expression (3a) corresponds to an x-axis direction position of the COP of the i-th contacting portion, and Lxp(i) and Lxm(i) are setting values of the upper limit value and the lower limit value of the existence permissible region of the x-axis direction position of the COP, respectively.

Moreover, nx(i)/fz(i) in the expression (3b) corresponds to a y-axis direction position of the COP of the i-th contacting portion, and Lyp(i) and Lym(i) are setting values of the upper limit value and the lower limit value of the existence permissible region of the y-axis direction position of the COP, respectively.

The values Lxp(i), Lxm(i), Lyp(i), and Lym(i) are set so that the existence permissible region (quadrangular region) of the COP specified by the expressions (3a) and (3b) is a region falling within the contact surface between the i-th contacting portion and the external object (preferably, a region rather smaller than the contact surface).

The existence permissible region of the COP specified by the inequalities (3a) and (3b) is specifically a quadrangular region enclosed by two straight lines parallel to the x axis of the i-th contact coordinate system and two straight lines parallel to the y axis thereof. Note that, however, the boundary line of the existence permissible region of the COP specified by the COP constraint condition may be oblique to the x or y axis.

Moreover, the existence permissible region may be a polygonal region (a hexagonal region or the like) other than the quadrangular region. In this case, the COP constraint condition can be expressed by a plurality of inequalities in the form of "a·nx(i)+b·ny(i)≥c·fz(i)" (characters a, b, and c are constant values), for example.

The drag constraint condition is a condition that the direction of a vector of the translational force of the contact reaction force received by each contacting portion (13 or 23) is not a direction of dragging the i-th contacting portion into the inside of the external object. This drag constraint condition is expressed by the following expression (4), for example.

$$fz(i) \geq 0 \quad (4)$$

where the positive direction of fz(i) is the z-axis direction of the i-th contact coordinate system and is also a direction toward the i-th contacting portion from the contact surface.

The drag constraint condition expressed by the above expression (4) is, in other words, a condition that the translational force component fz(i) in the z-axis direction of the i-th contact coordinate system of the contact reaction force ↑w(i) received by the i-th contacting portion does not have a negative value or a condition that the lower limit value of fz(i) is zero. The lower limit value of fz(i) in the drag constraint condition may be set to a value slightly greater than zero.

In this embodiment, the contact reaction force constraint condition (the friction force constraint condition, the COP constraint condition, or the drag constraint condition) given to the arithmetic processing unit 40 is set as described above.

Note here that the translational friction force constraint condition, the rotational friction force constraint condition, the COP constraint condition, and the drag constraint condition set concerning each contacting portion (13 or 23) as described above are, in other words, constraint conditions which can be expressed by linear inequalities concerning the contact reaction force received by the contacting portion (13 or 23).

Specifically, each of the inequalities representing the above constraint conditions concerning the i-th contacting portion is equivalent to a linear inequality (a linear inequality expressed by the following expression (5a) or (5b)) in the form in which the value obtained by linearly combining the components fx(i), fy(i), fz(i), nx(i), ny(i), and nz(i) of the contact reaction force ↑w(i) is equal to or greater than, or equal to or smaller than a predetermined value.

$$\uparrow c(i)^T \cdot \uparrow w(i) \geq k(i) \quad (5a)$$

$$\uparrow c(i)^T \cdot \uparrow w(i) \leq k(i) \quad (5b)$$

where ↑c(i) is a coefficient vector composed of coefficients related to the components fx(i), fy(i), fz(i), nx(i), ny(i), and nz(i) of the contact reaction force ↑w(i) acting on the i-th contacting portion and k(i) is a constant value of a certain value.

For example, an inequality of the expression (11a) concerning the translational friction force constraint condition is equivalent to a pair of a linear inequality of the expression (5a) where ↑c(i)=[−1, 0, μt(i), 0, 0, 0]T and k(i)=0 (or a linear inequality of the expression (5b) where ↑c(i)=[1, 0, −μt(i), 0, 0, 0] and k(i)=0) and to a linear inequality of the expression (5a) where ↑c(i)=[1, 0, μt(i), 0, 0, 0]T and k(i)=0 (or a linear inequality of the expression (5b) where ↑c(i)= [−1, 0, −μt(i), 0, 0, 0]T and k(i)=0). This is the same as for the inequalities of the above expressions (1b), (2), (3a), (3b), and (4).

Furthermore, when an equation obtained by transforming the contact reaction force ↑w(i) viewed in the i-th contact coordinate system to a vector (six-component vector) viewed in the global coordinate system (an XYZ coordinate system set in the operating environment of the robot 1) is denoted by ↑W(i)=[fX(i), fY(i), fZ(i), nX(i), nY(i), nZ(i)]$^T$, a relation expressed by the following expression (6) is established between ↑W(i) and ↑w(i).

$$\uparrow w(i) = R(i)^T \cdot \uparrow W(i) \quad (6)$$

where R(i) is a matrix having six lines and six columns specified according to the posture of the i-th contacting portion viewed in the global coordinate system, and R(i)$^T$ is a transposed matrix of R(i).

Therefore, each of the inequalities (inequalities expressed by expressions (1a), (1b), (2), (3a), (3b), and (4)) representing the respective contact reaction force constraint conditions concerning the contact reaction force received by the i-th contacting portion is equivalent to a linear inequality in the form in which the value obtained by linearly combining the components fX(i), fY(i), fZ(i), nX(i), nY(i), and nZ(i) of the contact reaction force ↑W(i) viewed in the global coordinate system of the i-th contacting portion as expressed by the following expression (7a) or (7b) is equal to or greater than, or equal to or smaller than a predetermined value.

$$(\uparrow c(i)^T \cdot R(i)T) \cdot \uparrow W(i) \geq k(i) \quad (7a)$$

$$(\uparrow c(i)^T \cdot R(i)^T) \cdot \uparrow W(i) \leq k(i) \quad (7b)$$

where $(\uparrow c(i)^T \cdot R(i)^T)$ is a coefficient vector composed of coefficients related to the components fX(i), fY(i), fZ(i), nX(i), nY(i), and nZ(i) of the contact reaction force ↑W(i) viewed in the global coordinate system.

As described hereinabove, the translational friction force constraint condition, the rotational friction force constraint condition, the COP constraint condition, and the drag constraint condition set concerning each contacting portion (13 or 23) are constraint conditions which can be expressed by linear inequalities in the form in which the value obtained by linearly combining the components of the contact reaction force is equal to or greater than, or equal to or smaller than a predetermined value in either of the case where the contact reaction force received by each contacting portion (13 or 23) is viewed in the i-th contact coordinate system corresponding to the contacting portion (13 or 23) and the case where the contact reaction force is viewed in the global coordinate system.

In addition, the contact reaction force constraint condition may include a constraint condition for limiting the range of the values of one or more components (components related to a translational force or to a moment) of the contact reaction force received from the external object by each contacting portion (13 or 23) to a range feasible by the performance of an actuator for driving each joint of the robot 1 or by a driving force which may be actually generated at each joint according to the specification such as the structure of each joint or may include a constraint condition for limiting the range of the values of one or more components of the above contact reaction force to a range of a practical use zone arbitrarily set by way of experiment or design. These constraint conditions are able to be expressed by inequalities in a form expressed by "a≤component of contact reaction force≤b" (a and b are constant values). Therefore, these constraint conditions are also able to be expressed by linear inequalities similarly to other contact reaction force constraint conditions described above.

As described above, the arithmetic processing unit 40 is provided with contacting portion position/posture information at each sampling time point, the contact reaction force constraint conditions concerning the contact reaction force ↑w(i) viewed in the i-th contact coordinate system for each contacting portion (13 or 23) (the constraint conditions expressed by the above inequalities (1a) to (4) or by the linear inequality (5a) or (5b) equivalent thereto), and the specific state quantity indicating information.

The arithmetic processing unit 40 includes, as functions implemented by an installed program or a hardware configuration, a polyhedron parameter determining section 41 which determines a parameter for specifying a convex polyhedron in a multivariate space which is configured with the components (six components) of a contact reaction force of each contacting portion (13 or 23) at each sampling time point and the components of a specific state quantity indicated by the specific state quantity indicating information (a specific state quantity viewed in the global coordinate system) as variable components (hereinafter, the parameter is referred to as "polyhedron parameter") and a polyhedron projection processing section 42 which performs polyhedron projection processing of projecting the convex polyhedron specified by the polyhedron parameter to a subspace having the components of the specific state quantity as variable components. The possible existence region of the specific state quantity is determined by the processing of the polyhedron projection processing section 42.

The above convex polyhedron in this embodiment is, more specifically, a polyhedron in a multivariate space (a space with the number of dimensions equal to the total sum of the number of components of the contact reaction force ↑W(i) and the number of components of the specific state quantity) configured with the components (six components, fX(i), fY(i), fZ(i), nX(i), nY(i), and nZ(i)) of the contact reaction force ↑W(i) viewed in the global coordinate system and the components of the specific state quantity viewed in the global coordinate system as variable components, and the convex polyhedron corresponds to a set region of points able to satisfy a mechanical relation between the contact reaction forces of all contacting portions (the first to NL-th contacting portions) at each sampling time point and the specific state quantity and the aforementioned contact reaction force constraint conditions concerning all contacting portions (the first to NL-th contacting portions) in the multivariate space.

In this case, the above mechanical relation is expressed by the following expression (8) as an equation of motion concerning the entire motion of the robot 1.

[MATH. 1]

$$Gall \cdot \uparrow Wall = \uparrow Wb \quad (8)$$

where $$\uparrow Wall = [\uparrow W(1)^T, \uparrow W(2)^T, \ldots, \uparrow W(NL)^T]^T \quad (8a)$$

$$Gall = [G(1), G(2), \ldots, G(NL)] \quad (8b)$$

$$G(i) = \begin{bmatrix} E3 & 03 \\ VP(i) & E3 \end{bmatrix} (i = 1, 2, \ldots, NL) \quad (8c)$$

E3: Identity matrix of order 3, 03: Zero matrix of order 3
VP(i): Matrix (i = 1, 2, ..., and NL)
defined by expression (8d) (i = 1, 2, ..., NL)

-continued $$VP(i) \cdot \begin{bmatrix} nX(i) \\ nY(i) \\ nZ(i) \end{bmatrix} = \uparrow p(i) \times \begin{bmatrix} nX(i) \\ nY(i) \\ nZ(i) \end{bmatrix} \quad (8d)$$

$\uparrow p(i)$: Position of $i$-th contacting portion (vector) ($i = 1, 2, \ldots, NL$)

$$\uparrow Wb = \begin{bmatrix} M \cdot (\uparrow pg\_dot2 - \uparrow g) \\ \uparrow Lg\_dot - (\uparrow pg\_dot2 - \uparrow g) \times \uparrow pg \end{bmatrix} \quad (8e)$$

$M$: Total mass of robot, $\uparrow g$: Gravitational acceleration (vector)

$\uparrow pg\_dot2$: Translational acceleration of overall center of gravity of robot (vector)

$\uparrow Lg\_dot$: Temporal change rate of angular momentum about overall center of gravity of robot (vector)

$\uparrow pg$: Position of overall center of gravity (vector)

The above expression (8) represents a balance between a resultant force of all contact reaction forces (a translational force and a moment) acting on the robot 1, a gravitational force acting on the robot 1, and an overall inertial force (a translational force and a moment) generated by a motion of the robot 1.

In this case, the equations in the first to third lines of the expression (8) are balance equations concerning the translational force, and the equations in the fourth to sixth lines are balance equations concerning the moment (moment about the origin of the global coordinate system).

Furthermore, the components of $\uparrow pg$, $\uparrow pg\_dot2$, and $\uparrow Lg\_dot$ are state quantities able to be used as the specific state quantities.

In the case where inertia about the overall center of gravity of the robot 1 at each sampling time point is known or in the case where the inertia can be estimated, it is also possible to use $I \cdot \uparrow \omega\_dot$ (I: a matrix or scalar representing inertia, $\uparrow \omega\_dot$: an angular acceleration about the overall center of gravity (vector)), instead of $\uparrow Lg\_dot$ of the expression (8e). In this case, the components of $\uparrow \omega\_dot$ are able to be used as specific state quantities.

Furthermore, the contact reaction force constraint conditions specifying the convex polyhedron are obtained by transforming the contact reaction force constraint conditions concerning the contact reaction force $\uparrow w(i)$ viewed in the i-th contact coordinate system to contact reaction force constraint conditions concerning the contact reaction force $\uparrow W(i)$ viewed in the global coordinate system for each contacting portion (13 or 23) at each sampling time point.

In this case, the whole of the contact reaction force constraint conditions concerning all contacting portions (the first to NL-th contacting portions) is expressed by a matrix linear inequality in the form of the following expression (9a) or (9b) on the basis of the above expression (7a) or (7b).

$$Ca11 \cdot \uparrow Wa11 \geq \uparrow k \quad (9a)$$

$$Ca11 \cdot \uparrow Wa11 \leq \uparrow k \quad (9b)$$

where Ca11 is a coefficient matrix of $\uparrow Wa11$ and $\uparrow k$ is a vector whose components are constant values. Additionally, each line of the expression (9a) or (9b) is an individual linear inequality representing each contact reaction force constraint condition. In this case, the number of lines of the coefficient matrix Ca11 (=the number of components of $\uparrow k$) equals the total number of all linear inequalities representing the contact reaction force constraint conditions concerning all contacting portions (the first to NL-th contacting portions).

For example, if the contact reaction force constraint conditions concerning the contact reaction force $\uparrow w(i)$ viewed in the i-th contact coordinate system are expressed by the above inequalities (1a) to (4) for each contacting portion (13 or 23), the total number of the inequalities for each contacting portion (13 or 23) is 11 (in this description, it is assumed that the expressions (1a), (1b), (2), (3a), and (3b) are each composed of two inequalities) and therefore the number of lines of the coefficient matrix Ca11 is (11·NL).

As described above, the mechanical relation and the contact reaction force constraint conditions specifying the convex polyhedron are expressed by the expression (8) and the expression (9a) or (9b). In this embodiment, a polyhedron parameter determined by the polyhedron parameter determining section 41 (a polyhedron parameter at each sampling time point) includes the respective component values of a coefficient matrix Ga11 in a mechanical relation expressed by the expression (8), and the respective component values of the left-hand side coefficient matrix Ca11 and the respective component values of the right-hand side vector $\uparrow k$ of the matrix linear inequality expressed by the expression (9a) or (9b).

The arithmetic processing unit 40 calculates the possible existence region of the specific state quantity at each sampling time point as described below.

The arithmetic processing unit 40, first, determines the above polyhedron parameters Ga11, Ca11, and $\uparrow k$ by using the polyhedron parameter determining section 41 (therefore fixes a convex polyhedron at each sampling time point).

In this case, the polyhedron parameter determining section 41 determines the coefficient matrix Ga11 of the expression (8) according to the definition represented by the expressions (8b) to (8d) by using the desired positions (desired positions viewed in the global coordinate system) of the first to NL-th contacting portions indicated by the contacting portion position/posture information at each sampling time point as positions p(i) (i=1, 2, . . . , and NL) in the above expression (8d).

Moreover, the polyhedron parameter determining section 41 determines individual linear inequalities representing the contact reaction force constraint conditions concerning the contact reaction force $\uparrow W(i)$ viewed in the global coordinate system on the basis of the above expression (7a) or (7b) from the inequalities (the above inequalities (1a) to (4)) representing the contact reaction force constraint conditions concerning the contact reaction force $\uparrow w(i)$ (i=1, 2, . . . , and NL) viewed in the i-th contact coordinate system for each contacting portion (13 or 23). In this case, the matrix R(i) (i=1, 2, . . . , and NL) in the expression (7a) or (7b) is determined from the desired posture (the desired posture viewed in the global coordinate system) of the i-th contacting portion indicated by the contacting portion position/posture information at each sampling time point.

The polyhedron parameter determining section 41 then determines the coefficient matrix Ca11 and the vector $\uparrow k$ in the expression (9a) or (9b) from these linear inequalities.

After determining the polyhedron parameter at each sampling time point as described above, the arithmetic processing unit 40 performs polyhedron projection processing by using the polyhedron projection processing section 42, where the polyhedron projection processing is performed for finding a projection region, which is obtained by projecting the convex polyhedron specified by the polyhedron parameter to a subspace with the specific state quantity indicated by the specific state quantity indicating information as variable components. The subspace is a space composed of some variable components of a multivariate space (in this embodiment, a space higher in dimensions than six dimensions) representing a convex polyhedron, and therefore the subspace is a space lower in dimensions than the multivariate space. For example, if the specific state quantity corresponds to three components of the overall center-of-gravity position ↑pg of the robot 1, the subspace is a three-dimensional space.

The aforementioned polyhedron projection processing is conceptually processing as illustrated in FIG. 4. FIG. 4 conceptually illustrates a state in which an M-dimensional convex polyhedron is projected to a lower-dimensional (m-dimensional) space. Since the above convex polyhedron in this embodiment is a polyhedron in a higher-dimensional (M-dimensional) multivariate space than a six dimensional one, the convex polyhedron cannot be visually illustrated. Therefore, in FIG. 4, the convex polyhedron is illustrated as a three-dimensional convex polyhedron, and the projection region obtained by projecting the convex polyhedron is illustrated as regions in a two-dimensional space (plane), for convenience.

This polyhedron projection processing is able to be performed by known processing referred to as "multi parametric linear programming," for example (including V-rep processing). Alternatively, the aforementioned processes 1 to 4 or processes 11 to 18 are able to be used as the polyhedron projection processing. In this polyhedron projection processing, components other than those of the specific state quantities, among the components of the overall center-of-gravity position ↑pg, the overall center-of-gravity translational acceleration ↑pg_dot2, and the temporal change rate ↑Lg_dot of an angular momentum about the overall center of gravity, have predetermined values previously determined as the values (desired values) of the components concerned at each sampling time point.

The above polyhedron projection processing enables the determination of the projection region obtained by projecting the polyhedron to a subspace, which is formed with the specific state quantity as variable components. This projection region represents a possible existence region of the specific state quantity able to satisfy the mechanical relation expressed by the expression (8) and the contact reaction force constraint condition expressed by the expression (9a) or (9b). Therefore, the possible existence region of the specific state quantity is found by the processing of the polyhedron projection processing section 42.

A more concrete first example of the polyhedron projection processing will be described below with reference to FIGS. 5, 6A, and 6B. This example is a case, for example, in which the aforementioned processes 1 to 4 are performed as polyhedron projection processing where the specific state quantities are two state quantities, an X-axis direction position pgx and a Y-axis direction position pgy of the overall center-of-gravity position ↑pg.

In this case, the polyhedron projection processing section 42 of the arithmetic processing unit 40 performs the polyhedron projection processing as illustrated in the flowchart of FIG. 5.

In step 1, the polyhedron projection processing section 42 finds the minimum value of the X-axis direction position pgx of the overall center of gravity able to satisfy the mechanical relation expressed by the expression (8) and the contact reaction force constraint condition expressed by the expression (9a) or (9b) by linear programming processing.

Furthermore, in step 2, the polyhedron projection processing section 42 finds the minimum value of a value (−pgx) obtained by inverting the sign of the X-axis direction position pgx of the overall center of gravity able to satisfy the mechanical relation expressed by the expression (8) and the contact reaction force constraint condition expressed by the expression (9a) or (9b) by the linear programming processing.

The linear programming processing in steps 1 and 2 may be known general processing. Moreover, in the linear programming processing in steps 1 and 2, the values of the specific state quantities other than the X-axis direction position pgx and the Y-axis direction position pgy of the overall center of gravity are set to previously determined values (for example, zero or the like).

Furthermore, in step 3, the polyhedron projection processing section 42 determines the minimum value of the X-axis direction position pgx found in step 1 as a lower limit value of the X-axis direction position pgx and determines the value (−pgx) obtained by inverting the sign of the minimum value found in step 2 as an upper limit value of the X-axis direction position pgx.

The processing of the above steps 1 to 3 corresponds to the process 1 described above. Through the processing of steps 1 to 3, there are found the lower limit value and the upper limit value of the X-axis direction position pgx able to satisfy the mechanical relation expressed by the expression (8) and the contact reaction force constraint condition expressed by the expression (9a) or (9b).

Subsequently, in step 4, the polyhedron projection processing section 42 sets n (a plurality of) representative values pgx(1), pgx(2), . . . , and pgx(n) including the lower limit value and the upper limit value of the X-axis direction position pgx in the range between the lower limit value and the upper limit value thereof. The processing of step 4 corresponds to the aforementioned process 2.

In this case, the n representative values are set so that a difference between representative values adjacent to each other is a constant value, for example. Moreover, one of the n representative values such as pgx(1), for example, is set to a value coincident with the lower limit value of the X-axis direction position pgx and another of the n representative values such as pgx(n), for example, is set to a value coincident with the upper limit value of the X-axis direction position pgx.

Figure 6A:
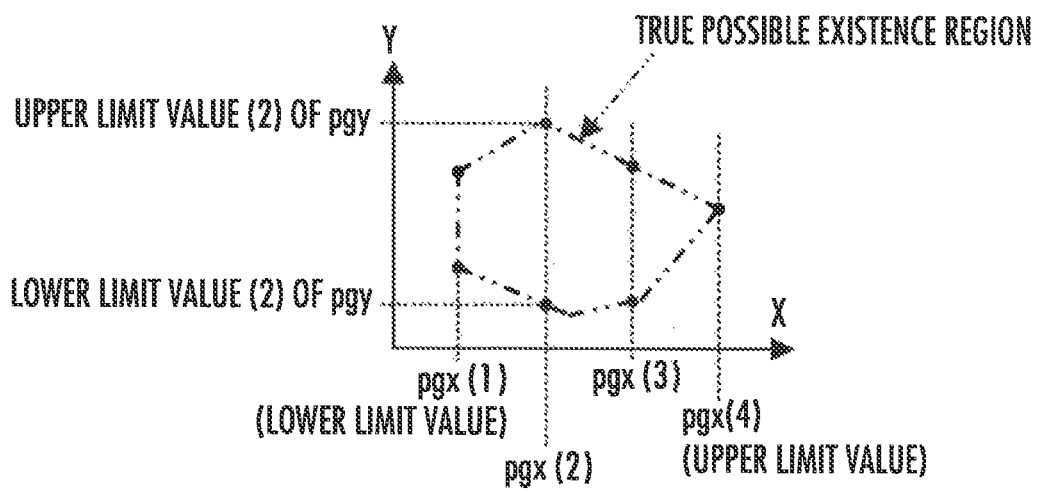
FIGS. 6A and 6B are explanatory diagrams related to the flowchart of FIG. 5.
Figure 6B:
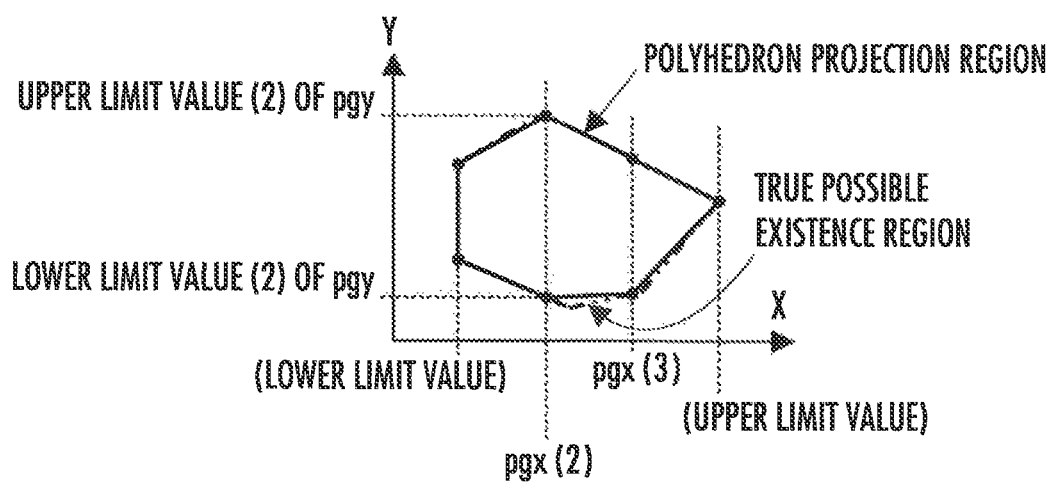

For example, in the case where the lower limit value and the upper limit value of the X-axis direction position pgx are found as illustrated in FIG. 6A, a plurality of (four in the illustrated example) representative values pgx(1) to pgx(4) of the X-axis direction position pgx are set. The region indicated by a two-dot chain line (a region on the XY coordinate plane) in FIG. 6A represents a true possible existence region of the pair of pgx and pgy.

In addition, the representative values other than the lower limit value and the upper limit value of the X-axis direction position pgx may be set at random within a range between the lower limit value and the upper limit value, for example.

Subsequently, the polyhedron projection processing section 42 sets the value of a number parameter h of the representative value of the X-axis direction position pgx to 1 in step 5 and then, in step 6, finds the minimum value of the Y-axis direction position pgy of the overall center of gravity able to satisfy the mechanical relation expressed by the expression (8) and the contact reaction force constraint condition expressed by the expression (9a) or (9b) by the linear programming processing, on the assumption that an equation "pgx=pgx(h)" is satisfied.

Furthermore, in step 7, the polyhedron projection processing section 42 finds the minimum value of a value (−pgy) obtained by inverting the sign of the Y-axis direction position pgy of the overall center of gravity able to satisfy the mechanical relation expressed by the expression (8) and the contact reaction force constraint condition expressed by the expression (9a) or (9b) by the linear programming processing, on the assumption that an equation "pgx=pgx (h)" is satisfied.

The linear programming processing in steps 6 and 7 are able to be performed in the same manner as steps 1 and 2 if another condition "pgx=pgx(h)" is added in addition to the mechanical relation expressed by the expression (8) and the contact reaction force constraint condition expressed by the expression (9a) or (9b).

Then, in step 8, the polyhedron projection processing section 42 determines the minimum value of the Y-axis direction position pgy found in step 6 as the lower limit value (h) of the Y-axis direction position pgy in the case where "pgx=pgx(h)" is satisfied and determines the value obtained by inverting the sign of the minimum value of the value (−pgy) found in step 7 as the upper limit value (h) of the Y-axis direction position pgy obtained in the case where "pgx=pgx(h)" is satisfied.

Subsequently, the polyhedron projection processing section 42 increments the value of the number parameter h by one in step 9 and then determines whether or not "h>n" is satisfied (whether or not the processing of steps 6 to 8 has been performed for all representative values of the X-axis direction position pgx) in step 10.

If the determination result of step 10 is negative, the polyhedron projection processing section 42 repeats the processing of steps 6 to 8.

The processing of steps 6 to 8 repeated until the determination result of step 10 becomes affirmative as described above corresponds to the above process 3. This repetition of the processing of steps 6 to 8 enables the finding of the lower limit value and the upper limit value of the Y-axis direction position pgy able to satisfy the mechanical relation expressed by the expression (8) and the contact reaction force constraint condition expressed by the expression (9a) or (9b) for each representative value of the X-axis direction position pgx.

For example, in FIG. 6A, the lower limit value (2) and the upper limit value (2) of the Y-axis direction position pgy are found corresponding to a representative value pgx(2) of the X-axis direction position pgx. This is the same as for other representative values pgx(1), pgx(3), and pgx(4) of the X-axis direction position pgx. In the example illustrated in FIG. 6A, the lower limit value (4) and the upper limit value (4) of the Y-axis direction position pgy corresponding to the representative value pgx(4) coincide with each other.

If the determination result of step 10 is affirmative, the polyhedron projection processing section 42 finds a region, which is obtained by the convex hull of a plurality of points (points on the XY coordinate plane) specified by the all representative values of the X-axis direction position pgx and by the lower limit value and the upper limit value of the Y-axis direction position pgy corresponding to the respective representative values, as a possible existence region (projection region) of the pair of pgx and pgy in step 11.

The processing of step 11 corresponds to the aforementioned process 4. By this processing, the region indicated by a solid line in FIG. 6B is found as a possible existence region (projection region) of the pair of pgx and pgy. The possible existence region approximately represents a true possible existence region.

As described hereinabove, the possible existence region of the pair of pgx and pgy as specific state quantities is able to be found at high speed in a short time by performing the illustrated polyhedron projection processing (the polyhedron projection processing based on the aforementioned processes 1 to 4).

Subsequently, a second example of the polyhedron projection processing will be described below with reference to FIGS. 7, 8A, and 8B. In this example, the aforementioned processes 11 to 18 (except the processes 16 and 17) are performed as the polyhedron projection processing in the case where the specific state quantities are three components pgx, pgy, and pgz of the overall center-of-gravity position ↑pg, for example.

In this case, the polyhedron projection processing section 42 of the arithmetic processing unit 40 performs the polyhedron projection processing as illustrated in the flowchart of FIG. 7.

The polyhedron projection processing section 42, first, performs the same processing as that of steps 1 to 10 of FIG. 5 described above. In this case, the processing of steps 1 to 3 corresponds to the aforementioned process 11, and the processing of step 4 corresponds to the aforementioned process 12. Moreover, the processing of steps 6 to 8 repeated until the determination result of step 10 becomes affirmative corresponds to the aforementioned process 13.

Subsequently, in step 12, the polyhedron projection processing section 42 sets a plurality of (m) representative points (pgx_h, pgy_h) (h=1, 2, . . . , and m) within a region (a two-dimensional convex hull region) obtained by the convex hull of a plurality of points (points on the two-dimensional plane where pgx and pgy are coordinate axis components) specified by all representative values of the X-axis direction position pgx and by the lower limit value and the upper limit value of the Y-axis direction position pgy corresponding to each representative value.

Figure 8A:
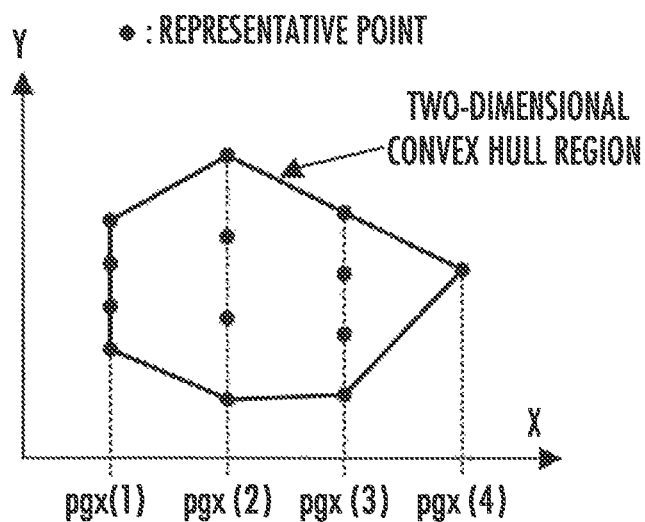
FIGS. 8A and 8B are explanatory diagrams related to the flowchart of FIG. 7.
Figure 8B:
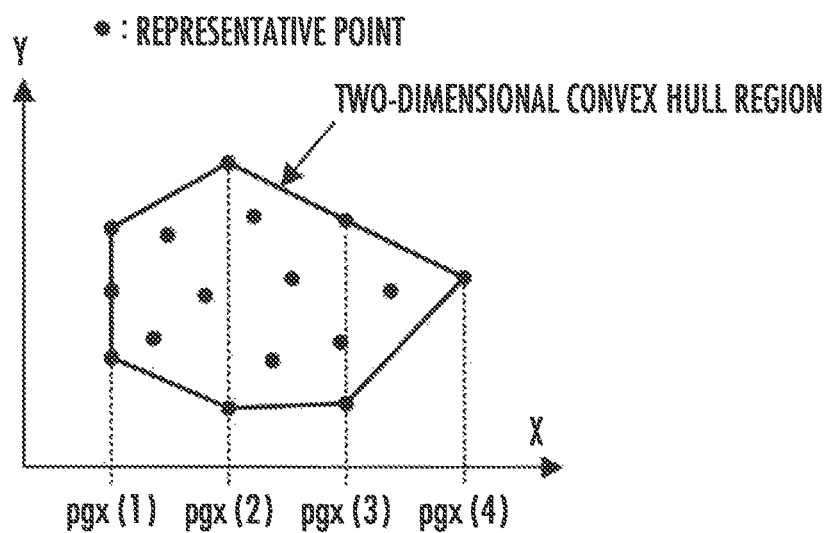

In this case, as illustrated in FIG. 8A or 8B, the m representative points are set so as to include respective apexes of the two-dimensional convex hull region. In addition, the representative points other than the respective apexes of the above two-dimensional convex hull region may be arbitrarily set.

For example, as illustrated in FIG. 8A, a plurality of representative values of the Y-axis direction position pgy are set so as to include the lower limit value and the upper limit value of the Y-axis direction position pgy between the lower limit value and the upper limit value thereof corresponding to the respective representative values of the X-axis direction position pgx (the representative values pgx(1), pgx(2), . . . , and pgx(n) set in the above step 4: n=4 in the illustrated example). Furthermore, the points specified by the pair of the representative values of the X-axis direction position pgx and the representative values of the Y-axis direction position pgy set so as to correspond thereto may be set as the aforementioned representative points.

In the example illustrated in FIG. 8A, the upper limit value and the lower limit value of the Y-axis direction position pgy, in the case of pgx=pgx(4), coincide with each other, and therefore the representative point satisfying "pgx=pgx(4)" is only one (the apex of the two-dimensional convex hull region).

In addition, as described above, if the plurality of representative points are set so that the pgx value coincides with one of the representative values pgx(1), pgx(2), . . . , and pgx(n) set in step 4, the representative points are included in the above two-dimensional convex hull region as a result.

Therefore, the two-dimensional convex hull region itself need not be found in advance.

Alternatively, as illustrated in FIG. 8B, for example, it is also possible to set representative points other than the apexes of the two-dimensional convex hull region arbitrarily (for example, randomly) in the inside of the two-dimensional convex hull region after finding the two-dimensional convex hull region. In this case, the pgx values at the representative points other than the apexes of the two-dimensional convex hull region may be different from the representative values pgx(1), pgx(2), . . . , and pgx(n) set in the above step 4.

As described above, a plurality of representative points are set in the two-dimensional convex hull region in step 12. The processing of step 12 corresponds to the aforementioned process 14.

Subsequently, the polyhedron projection processing section 42 sets the value of the number parameter h to 1 in step 13 and then, in step 14, finds the minimum value of the Z-axis direction position pgz of the overall center of gravity able to satisfy the mechanical relation expressed by the expression (8) and the contact reaction force constraint condition expressed by the expression (9a) or (9b) by the linear programming processing, on the assumption that "(pgx, pgy)=(pgx_h, pgy_h)" is satisfied.

Furthermore, in step 15, the polyhedron projection processing section 42 finds the minimum value of the value (−pgz) obtained by inverting the sign of the Z-axis direction position pgz of the overall center of gravity able to satisfy the mechanical relation expressed by the expression (8) and the contact reaction force constraint condition expressed by the expression (9a) or (9b) by the linear programming processing, on the assumption that "(pgx, pgy)=(pgx_h, pgy_h)" is satisfied.

In the linear programming processing in steps 14 and 15, the values of the specific state quantities other than the components pgx, pgy, and pgz of the overall center of gravity are assumed to be predetermined values (for example, zero or the like).

Then, in step 16, the polyhedron projection processing section 42 determines the minimum value of the Z-axis direction position pgz found in step 14 as the lower limit value of the Z-axis direction position pgz and determines the value obtained by inverting the sign of the minimum value of the value (−pgz) found in step 15 as the upper limit value of the Z-axis direction position pgz.

Subsequently, the polyhedron projection processing section 42 increments the value of the number parameter h by one in step 17 and then determines whether or not "h>m" is satisfied (whether or not the processing of steps 14 to 16 has been performed for all representative values of (pgx, pgy)) in step 18.

If the determination result of step 18 is negative, the polyhedron projection processing section 42 repeats the processing of steps 14 to 16.

The processing of steps 14 to 16 repeated until the determination result of step 18 becomes affirmative as described above corresponds to the aforementioned process 15.

This repetition of the processing of steps 14 to 16 enables the finding of the lower limit value and the upper limit value of the Z-axis direction position pgz able to satisfy the mechanical relation expressed by the expression (8) and the contact reaction force constraint condition expressed by the expression (9a) or (9b) for each representative value of (pgx, pgy).

Subsequently, if the determination result of step 18 is affirmative, the polyhedron projection processing section 42 finds a region (a three-dimensional convex hull region), which is obtained by the convex hull of a plurality of points (points on the three-dimensional space with pgx, pgy, and pgz as coordinate axis components) specified by the all representative points of (pgx, pgy) and by the lower limit value and the upper limit value of the Z-axis direction position pgz corresponding to the respective representative points, as a possible existence region (a projection region) of the group of pgx, pgy, and pgz in step 19.

The processing of step 19 corresponds to the aforementioned process 18. Thereby, the polyhedron projection processing based on the processes 11 to 18 enables the finding of the possible existence region (the projection region) of the group of pgx, pgy, and pgz.

Although the processing in the case of three specific state quantities (pgx, pgy, and pgz) has been described with reference to FIG. 7, it is also possible to find the possible existence region of the specific state quantities by the polyhedron processing based on the processes 11 to 18 also in the case of four or more specific state quantities.

If the specific state quantities are four state quantities including pgx, pgy, and pgz (hereinafter, the fourth state quantity is indicated by a reference character S for convenience), for example, the processes 16 and 17 are performed after the determination result of step 18 becomes affirmative.

Specifically, a plurality of representative points (including respective apexes of a three-dimensional convex hull region) are set within the three-dimensional convex hull region, which is obtained by the convex hull of a plurality of points (points on the three-dimensional space with pgx, pgy, and pgz as coordinate axis components) specified by the all representative points of (pgx, pgy) and by the lower limit value and the upper limit value of the Z-axis direction position pgz corresponding to the respective representative points. These representative points are able to be set in the same method as in the above step 12.

Then, the lower limit value and the upper limit value of the state quantity S able to satisfy the mechanical relation expressed by the expression (8) and the contact reaction force constraint condition expressed by the expression (9a) or (9b) are found for each representative point, on the assumption that (pgx, pgy, pgz) coincide with the values at the representative point. This processing is able to be performed by using the linear programming processing similarly to the processing of the above steps 14 to 16.

Subsequently, a region (four-dimensional convex hull region), which is obtained by the convex hull of a plurality of points (points on the four-dimensional space with pgx, pgy, pgz, and S as coordinate axis components) specified by the all representative points of (pgx, pgy, pgz) and by the lower limit value and the upper limit value of the state quantity S corresponding to the respective representative points, is found as a possible existence region (projection region) of the group of pgx, pgy, pgz, and S.

As described above, according to the polyhedron projection processing in which the linear programming processing is repeated more than once (the polyhedron projection processing based on the processes 1 to 4 and the polyhedron projection processing based on the processes 11 to 18), the possible existence region of the specific state quantities can be found at high speed in a short time, particularly in the case where the number of components of the specific state quantities is relatively small.

Examples of the possible existence region of the specific state quantities found by the processing of the arithmetic processing unit 40 described hereinabove are illustrated as shaded regions in FIGS. 9B, 10B, and 11B. In these examples, the specific state quantities are two components of the X-axis direction position and the Y-axis direction position of the overall center-of-gravity position ↑Pg at one sampling time point in a situation where the robot 1 is made to step up and down the ladder. Therefore, the possible existence regions of the specific state quantities illustrated in FIGS. 9B, 10B, and 11B are possible existence regions of points obtained by projecting the overall center of gravity of the robot 1 onto the horizontal plane (the XY coordinate plane) (hereinafter, referred to as "center-of-gravity possible existence region").

Figure 9A:
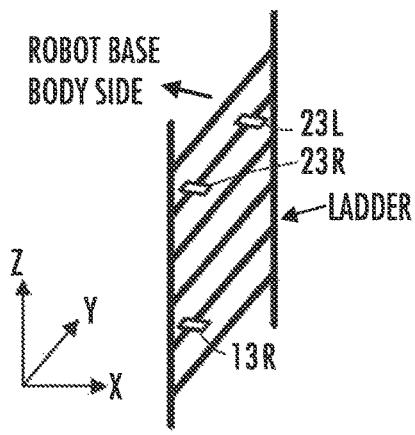
FIG. 9A is a diagram illustrating a first example of a contact pattern on a ladder of contacting portions of the mobile robot made to step up and down the ladder.
Figure 9B:
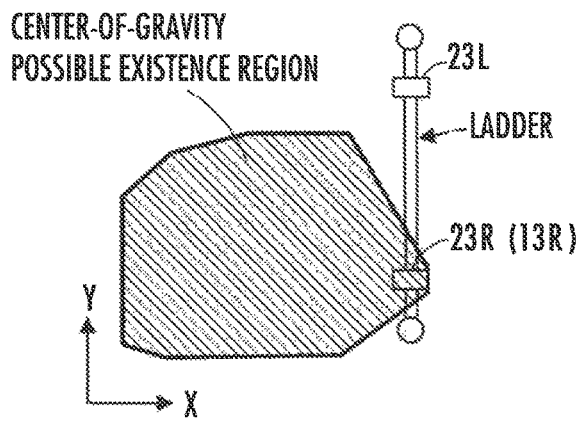
FIG. 9B is a diagram illustrating a center-of-gravity possible existence region found so as to correspond to the first example.
Figure 10A:
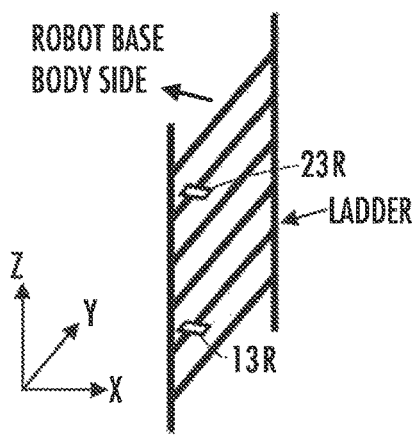
FIG. 10A is a diagram illustrating a second example of a contact pattern on a ladder of contacting portions of the mobile robot made to step up and down the ladder.
Figure 10B:
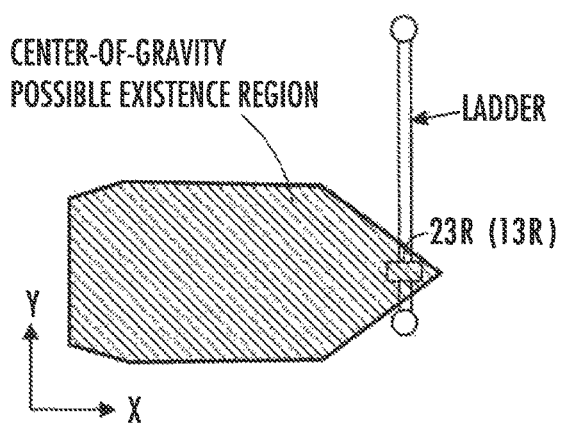
FIG. 10B is a diagram illustrating a center-of-gravity possible existence region found so as to correspond to the second example.
Figure 11A:
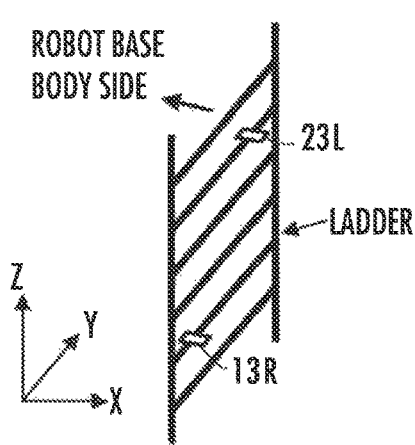
FIG. 11A is a diagram illustrating a third example of a contact pattern on a ladder of contacting portions of the mobile robot made to step up and down the ladder.
Figure 11B:
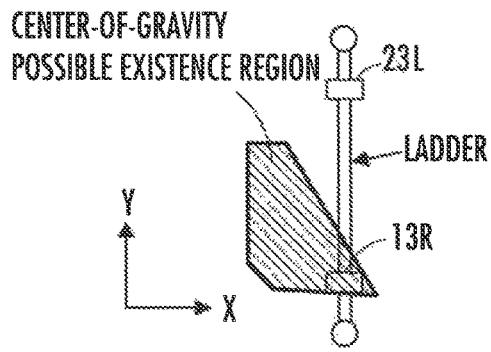
FIG. 11B is a diagram illustrating a center-of-gravity possible existence region found so as to correspond to the third example.

Furthermore, FIGS. 9A, 10A, and 11A corresponding to FIGS. 9B, 10B, and 11B, respectively, illustrate which contacting portion (13 or 23) of the robot 1 is in contact with the ladder.

In this case, FIG. 9A illustrates a state in which three contacting portions 23R, 23L, and 13R, namely, the right and left hand portions 23R and 23L and the right foot portion 13R of the robot 1 are in contact with rungs of the ladder at one sampling time point in the case where the robot 1 is made to step up and down the ladder in a so-called crawl mode. A center-of-gravity possible existence region found so as to correspond to this state by the arithmetic processing unit 40 is the shaded region illustrated in FIG. 9B.

Moreover, FIG. 10A illustrates a state in which two contacting portions 23R and 13R, namely, the right hand portion 23R and the right foot portion 13R of the robot 1 are in contact with rungs of the ladder at one sampling time point in the case where the robot 1 is made to step up and down the ladder in a so-called pace mode. A center-of-gravity possible existence region found so as to correspond to this state by the arithmetic processing unit 40 is the shaded region illustrated in FIG. 10B.

Furthermore, FIG. 11A illustrates a state in which two contacting portions 23L and 13R, namely, the left hand portion 23L and the right foot portion 13R of the robot 1 are in contact with rungs of the ladder at one sampling time point in the case where the robot 1 is made to step up and down the ladder in a so-called trot mode. A center-of-gravity possible existence region found so as to correspond to this state by the arithmetic processing unit 40 is the shaded region illustrated in FIG. 11B.

In any of these cases illustrated in FIGS. 9B, 10B, and 11B, the processing of the polyhedron projection processing section 42 of the arithmetic processing unit 40 was performed with both of the overall center-of-gravity translational acceleration ↑pg_dot2 of the robot 1 and the temporal change rate ↑Lg_dot of the angular momentum about the overall center of gravity of the robot 1 set to zero (in other words, assuming that the robot 1 is in a stationary state at each sampling time point of FIGS. 9A, 10A, and 11A).

The use of the center-of-gravity possible existence region found as described above enables an evaluation of whether or not the desired motion of the robot 1 arbitrarily generated to make the robot 1 to step up and down the ladder, for example, is appropriate. Specifically, it is possible to evaluate whether or not the desired motion is appropriate according to whether or not the overall center-of-gravity position specified by the generated desired motion of the robot 1 falls within the center-of-gravity possible existence region.

In addition, in the case where the center-of-gravity possible existence region is found as described above, the center-of-gravity possible existence region may also be found by previously determining the overall center-of-gravity translational acceleration ↑Pg_dot2 at each sampling time point of the desired motion of the robot 1 (or the temporal change rate of the overall center-of-gravity translational momentum) and the temporal change rate ↑Lg_dot of the angular momentum about the overall center of gravity (or an angular acceleration about the overall center of gravity), for example, and then performing the polyhedron projection processing by using these default values. In this case, it is possible to find the center-of-gravity possible existence region with the influence of the inertial force dynamically generated by the robot 1 reflected on the region.

Furthermore, in this case, it is also possible to find the possible existence region of a spatial position including the Z-axis direction position (height) of the overall center-of-gravity position ↑Pg.

The default value of the overall center-of-gravity translational acceleration ↑Pg_dot2 (or the temporal change rate of the overall center-of-gravity translational momentum) may be a value calculated by a differential operation from the predetermined overall center-of-gravity transitional moving velocity or a time-transition pattern of the translational momentum. Similarly, the temporal change rate ↑Lg_dot of the angular momentum about the overall center of gravity or the angular acceleration about the overall center of gravity may be a value calculated by a differential operation from the predetermined angular momentum about the overall center of gravity or a time-transition pattern of an angular velocity.

Subsequently, description will be made on an example of a method of generating a desired motion (a future desired motion after the current time) of the robot 1 while performing an actual motion of the robot 1 by using the possible existence region of the specific state quantities found as described above such as, for example, the center-of-gravity possible existence region.

As this method, it is possible to use a method of sequentially determining the displacement amounts of the respective joints (elemental joints) of the robot 1 so as to minimize the value of the evaluation function FE defined by the following expressions (10a) and (10b) within a range satisfying the conditions of the following expressions (10c) and (10d), for example.

$$FE = \uparrow q\_dot^T \cdot Wt1 \cdot \uparrow q\_dot + \Sigma \uparrow dV(j)^T \cdot Wt2(j) \cdot \uparrow dV(j) \tag{10a}$$

where $$\uparrow dV(j) = J(j) \cdot \uparrow q\_dot - \uparrow x\_dot(j) \tag{10b}$$

$$\xi \cdot (\uparrow \theta max - \theta 0) \geq \uparrow \theta\_dot \cdot dt \geq \xi \cdot (\uparrow \theta min - \uparrow \theta 0) \tag{10c}$$

$$Jcol \cdot \uparrow q\_dot \geq \uparrow xc\_dot \tag{10d}$$

where, in the expressions (10a) and (10b), ↑q_dot is a generalized variable vector of an arrangement of the translational velocity and the rotational angular velocity (each is a three-component vector) of the base body 2 of the robot 1 viewed in the global coordinate system and the displacement rate (the displacement amount per unit time) of each elemental joint of the robot 1, Wt1 and Wt2(j) are weight matrices, J(j) is a Jacobian corresponding to each of the respective contacting portions (13 or 23) and the overall center of gravity of the robot 1, and ↑x_dot(j) is a desired velocity (a vector composed of the desired value of the translational velocity and the desired value of the rotational angular velocity) of each of the respective contacting portions (13 or 23) and the overall center of gravity.

In this case, each desired velocity is calculated so as to cause the measurement value or estimated value of each of the actual position and posture of each contacting portion (13 or 23), the actual posture of the base body 2, the actual displacement amount of each elemental joint, and the actual position of the overall center of gravity, for example, to follow the desired value of each according to a feedback control law such as a proportional control law. The desired value of the overall center-of-gravity position among these desired values is set to the central point (the center-of-gravity point) of the center-of-gravity possible existence region, for example.

Moreover, in the expression (10c), ↑θmax is a vector in which upper limit displacement amounts of the respective elemental joints are arranged, ↑θmin is a vector in which lower limit displacement amounts of the respective elemental joints are arranged, ↑θ0 is an initial value of the displacement amount of each joint element in a desired motion to be generated anew, ↑θ_dot is a vector in which displacement rates of the respective joint elements are arranged, dt is a time interval for generating a desired motion, and ξ is a coefficient having a predetermined value.

The expression (10c) is an inequality representing a constraint condition for limiting the desired displacement amount of each elemental joint determined by desired motion generation processing to a range between the upper limit displacement amount and the lower limit displacement amount.

Moreover, in the expression (10d), Jcol is a Jacobian corresponding to a site where a self interference of the robot 1 may occur or a site where an interference with an external object may occur, and ↑xc_dot is a predetermined velocity limiting value (a limiting value of the translational velocity and the rotational angular velocity) of the site concerned. This expression (10d) is an inequality representing a constraint condition for preventing the interference of the site concerned.

Furthermore, a well-known solution method of a quadratic programming problem can be used to sequentially determine the displacement amounts of the respective joints (elemental joints) of the robot 1 so as to minimize the value of the evaluation function FE defined by the expressions (10a) and (10b) within the range satisfying the conditions of the above expressions (10c) and (10d).

The generation of the desired motion in this method enables the generation of the overall center-of-gravity position of the robot 1 in the desired motion so that the overall center-of-gravity position falls within the center-of-gravity possible existence region.

Figure 12A:
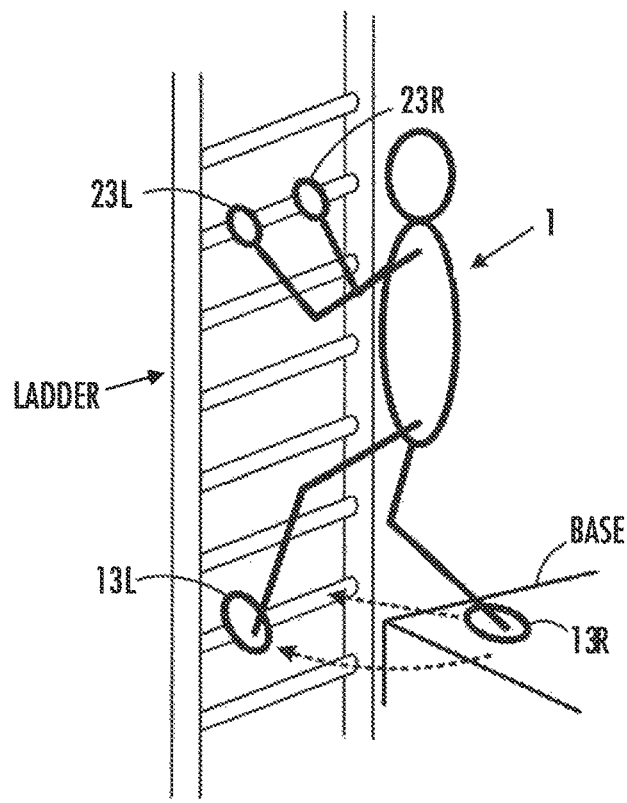
FIG. 12A is a diagram illustrating an example of an action in the case where the mobile robot is made to move on to the ladder from a base.
Figure 12B:
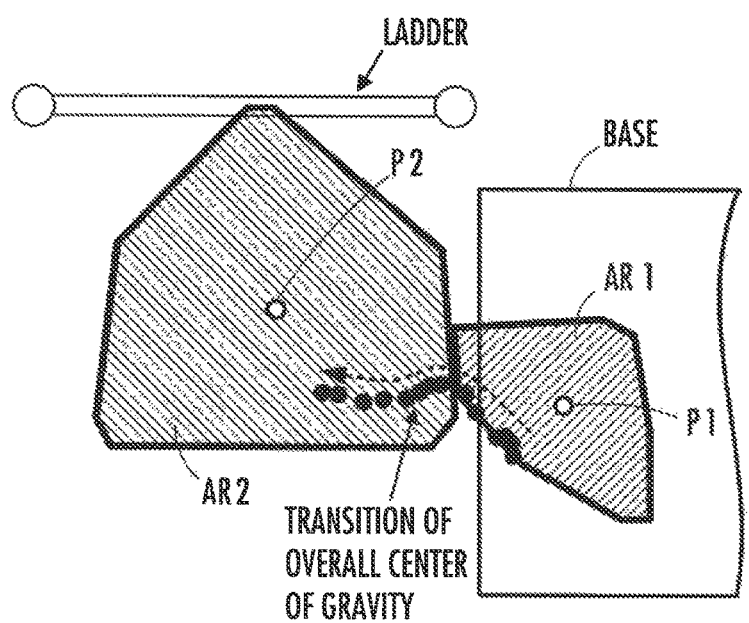
FIG. 12B is a diagram illustrating a transition mode of the overall center of gravity and a center-of-gravity possible existence region of the mobile robot in a desired motion generated so as to correspond to the example of action.

Note here that FIG. 12B is a diagram illustrating how the overall center-of-gravity desired position (the position on the XY coordinate plane) of the robot 1 transitions in the case where the desired motion of the robot 1 is generated by using the above method. Furthermore, FIG. 12A is a diagram illustrating the action mode of the robot 1 corresponding to FIG. 12B.

As illustrated in FIG. 12A, the desired motion of the robot 1 in this example is performed in the case where the robot 1 is made to move on to the ladder from the base. In this desired motion, the robot 1, first, moves the left foot portion 13L of the right and left foot portions 13R and 13L from the base to a rung of the ladder with both hand portions 23R and 23L supported by a rung of the ladder. Subsequently, the robot 1 moves the right foot portion 13R from the base to the rung of the ladder.

In FIG. 12B, a shaded region AR1 is a center-of-gravity possible existence region achieved when the robot 1 brings both foot portions 13R and 13L thereof into contact with the base, and a shaded region AR2 is a center-of-gravity possible existence region achieved when the robot 1 brings both foot portions 13R and 13L thereof into contact with the rung of the ladder. In addition, a black dot sequence represents the transition of the overall center of gravity of the robot 1 in the desired motion. A white dot P1 indicates the center-of-gravity point of the center-of-gravity possible existence region AR1, and a white dot P2 indicates the center-of-gravity point of the center-of-gravity possible existence region AR2.

As illustrated in FIG. 12B, it is understood that the desired motion of the robot 1 is able to be generated so that the overall center of gravity of the robot 1 transitions in such a way as to fall within the center-of-gravity possible existence regions AR1 and AR2.

The above embodiment has been described by giving an example of a case where the center-of-gravity possible existence region is found as a possible existence region of a specific state quantity as a major instance. Note that, however, the specific state quantity is not limited to the overall center-of-gravity position ↑Pg of the robot 1. The specific state quantity for which the possible existence region is found may be, for example, one or more components of the overall center-of-gravity translational acceleration ↑Pg_dot2 or the temporal change rate of the translational momentum of the robot 1 or one or more components of the temporal change rate ↑Lg_dot of the angular momentum about the overall center-of-gravity or the angular acceleration about the overall center of gravity of the robot 1.

Furthermore, the specific state quantity may be a combination of one or more components of the overall center-of-gravity position ↑Pg of the robot 1, one or more components of the overall center-of-gravity translational acceleration ↑Pg_dot2 or the temporal change rate of the translational momentum of the robot 1, and one or more components of the temporal change rate ↑Lg_dot of the angular momentum about the overall center of gravity or the angular acceleration about the overall center of gravity of the robot 1.

Furthermore, the contact reaction force constraint condition for specifying a polyhedron may be only the translational friction force constraint condition, the rotational friction force constraint condition, the COP constraint condition, the drag constraint condition, or some of constraint conditions appropriate for a driving force which can be generated at each joint, or alternatively may include constraint conditions other than these constraint conditions.

Moreover, in the above embodiment, the contact reaction force (contact wrench) of each contacting portion (13 or 23) is a pair (a six-component vector) of a translational force (three-dimensional vector) and a moment (three-dimensional vector). As the contact reaction force, however, only the translational force may be employed.

Furthermore, although the polyhedron processing described with reference to FIG. 5 or 7 (polyhedron processing in which the linear programming processing is repeated) is performed in the case where the convex polyhedron is a bounded region (a closed region), the present invention is also applicable to a case where the convex polyhedron is unbounded. In this case, multi parametric linear programming processing may be used as the polyhedron projection processing.

Since the value of each component of the contact reaction force acting on each contacting portion cannot reach an infinite value in an individual mobile robot, the value is within a finite range. Furthermore, the convex polyhedron can be caused to be a bounded region (a closed region) by including the constraint condition for limiting the range of the value of each component to within the finite range in the contact reaction force constraint condition. Consequently, the processing of repeating the linear programming processing can be used as the polyhedron projection processing.

Moreover, the mobile robot to which the present invention is applicable is not limited to the robot 1, but may be a robot having five or more links which include portions to be in contact with external objects. In addition, the present invention is not limited to a humanoid mobile robot, but applicable to various forms of mobile robots.

What is claimed is:

1. A device for estimating a possible existence region of a specific state quantity of a mobile robot which moves by a motion of repeating an air movement and a contact with an external object following the air movement of each of a plurality of contacting portions, wherein the possible existence region is intended for a value of a specific state quantity composed of one or more state quantities among a position of an overall center-of-gravity of the mobile robot, a translational motion state quantity of the overall center of gravity, and a rotational motion state quantity about the overall center of gravity, and wherein the possible existence region is able to satisfy a contact reaction force constraint condition which is a constraint condition related to contact reaction forces acting on the respective contacting portions, wherein:

the device includes at least one processor configured to function as a polyhedron projection processing section which performs one of multi parametric linear programming processing and processing of repeating linear programming processing more than once, as polyhedron projection processing for finding a projection region obtained by projecting a convex polyhedron to a subspace representing the specific state quantity among variable components, where the convex polyhedron is within a space configured with the contact reaction forces of the plurality of contacting portions and the specific state quantity as the variable components and where the convex polyhedron is specified by a mechanical relation between the contact reaction forces and the specific state quantity and by a linear inequality representing a contact reaction force constraint condition, and the device is configured to output the projection region found by the polyhedron projection processing as an estimated region of the possible existence region, the specific state quantity includes two state quantities s(1) and s(2); and the polyhedron projection processing section is configured to perform the following processes 1 to 4 as the polyhedron projection processing:

process 1: find an upper limit value and a lower limit value of the state quantity s(1) able to satisfy the mechanical relation and the contact reaction force constraint condition by the linear programming processing;

process 2: set a plurality of representative values with the upper limit value and the lower limit value of the state quantity s(1) included in a range between the upper limit value and the lower limit value;

process 3: find an upper limit value and a lower limit value of the state quantity s(2) able to satisfy the mechanical relation and the contact reaction force constraint condition by the linear programming processing for all representative values of the state quantity s(1) on the assumption that the value of the state quantity s(1) coincides with one of the plurality of representative values set in the process 2; and process 4: find a region obtained by convex hull of a plurality of points specified by all respective representative values of the state quantity s(1) and by the upper limit value and the lower limit value of the state quantity s(2) for each representative value of the state quantity s(1) as the projection region.

2. A device for estimating a possible existence region of a specific state quantity of a mobile robot which moves by a motion of repeating an air movement and a contact with an external object following the air movement of each of a plurality of contacting portions, wherein the possible existence region is intended for a value of a specific state quantity composed of one or more state quantities among a position of an overall center-of-gravity of the mobile robot, a translational motion state quantity of the overall center of gravity, and a rotational motion state quantity about the overall center of gravity, and wherein the possible existence region is able to satisfy a contact reaction force constraint condition which is a constraint condition related to contact reaction forces acting on the respective contacting portions, wherein:

the device includes at least one processor configured to function as a polyhedron projection processing section which performs one of multi parametric linear programming processing and processing of repeating linear programming processing more than once, as polyhedron projection processing for finding a projection region obtained by projecting a convex polyhedron to a subspace representing the specific state quantity among variable components, where the convex polyhedron is within a space configured with the contact reaction forces of the plurality of contacting portions and the specific state quantity as the variable components and where the convex polyhedron is specified by a mechanical relation between the contact reaction forces and the specific state quantity and by a linear inequality representing a contact reaction force constraint condition, and the device is configured to output the projection region found by the polyhedron projection processing as an estimated region of the possible existence region, the specific state quantity includes three or more state quantities s(i) (i=1, 2, . . . , and N); and the polyhedron projection processing section is configured to perform the following processes 11 to 18 as the polyhedron projection processing:

process 11: find an upper limit value and a lower limit value of the state quantity s(1) able to satisfy the mechanical relation and the contact reaction force constraint condition by the linear programming processing;

process 12: set a plurality of representative values with the upper limit value and the lower limit value of the state quantity s(1) included in a range between the upper limit value and the lower limit value;

process 13: find an upper limit value and a lower limit value of the state quantity s(2) able to satisfy the mechanical relation and the contact reaction force constraint condition by the linear programming processing for all representative values of the state quantity s(1) on the assumption that the value of the state quantity s(1) coincides with one of the plurality of representative values set in the process 12;

process 14: set a plurality of representative points, including respective apexes of a two-dimensional convex hull region, within the two-dimensional convex hull region which is obtained by convex hull of a plurality of points specified by all respective representative values of the state quantity s(1) and by the upper limit value and the lower limit value of the state quantity (2) for each representative value of the state quantity s(1) in a two-dimensional space with the state quantities s(1) and s(2) as variable components;

process 15: find an upper limit value and a lower limit value of the state quantity s(k) able to satisfy the mechanical relation and the contact reaction force constraint condition by the linear programming processing for all representative points set within a (k−1)-dimensional convex hull region, on the assumption that each of the values of (k−1) (k: 3 or greater integer) state quantities s(1), . . . , and s(k−1), among N state quantities s(i) (i=1, 2, . . . , and N), coincides with the value at one set representative point within the (k−1)-dimensional convex hull region;

process 16: if k<N, set a plurality of representative points, including respective apexes of a k-dimensional convex hull region, within the k-dimensional convex hull region which is obtained by convex hull of a plurality of points specified by a group of values of s(1), . . . , and s(k−1) corresponding to all respective representative points set within the (k−1)-dimensional convex hull region and by the upper limit value and the lower limit value of a state quantity s(k) for each of the representative points in a k-dimensional space with k state quantities s(1), . . . , and s(k) as variable components;

process 17: repeat the processes 15 and 16 until the process 15 when k=N is completed and, upon the completion of the process 15 when k=N, proceed to process 18; and process 18: find, as the polyhedron projection region, an N-dimensional convex hull region obtained by convex hull of a plurality of points specified by a group of values of s(1), . . . , and s(N−1) corresponding to all respective representative points set within an (N−1)-dimensional convex hull region and by the upper limit value and the lower limit value of a state quantity s(N) for each of the representative points in an N-dimensional space with N state quantities s(i) (i=1, 2, . . . , and N) as variable components.

* * * * *